United States Patent [19]

Nishiyama et al.

[11] Patent Number: 5,859,977
[45] Date of Patent: Jan. 12, 1999

[54] SYSTEM FOR SOFTWARE UPDATE IN MANNER BASED ON PROCESSING PROPERTIES OF DEVICES VIA MAINTENANCE NETWORK WHILE ALLOWING DATA TRANSMISSION BETWEEN DEVICES ON ANOTHER NETWORK

[75] Inventors: Shuji Nishiyama; Hiroaki Nakanishi, both of Hitachi; Hideki Sato; Hiroshi Kobayashi, both of Katsuta; Shigeru Endo, Ibaraki-ken; Toshimasa Saika, Hitachiota; Teruyasu Nakahashi, Hitachi; Hiroyuki Hori, Hitachi; Tomohito Ebina, Hitachi; Keiichi Sannomiya, Hitachi; Shimako Tanno, Hitachi, all of Japan

[73] Assignees: Hitachi, Ltd., Tokyo; Hitachi Process Engineering, Inc., Hitachi, both of Japan

[21] Appl. No.: 453,338

[22] Filed: May 30, 1995

Related U.S. Application Data

[63] Continuation of Ser. No. 305,758, Sep. 14, 1994, abandoned, which is a continuation of Ser. No. 962,642, Oct. 16, 1992, abandoned.

[30] Foreign Application Priority Data

Oct. 18, 1991 [JP] Japan .................................. 3-270686

[51] Int. Cl.⁶ ................................................. G06F 15/163
[52] U.S. Cl. .............................. 395/200.53; 395/200.79; 395/712
[58] Field of Search ................................. 395/200, 100, 395/700, 900, 600, 200.53, 200.79, 712; 364/300, 700

[56] References Cited

U.S. PATENT DOCUMENTS

| | | | |
|---|---|---|---|
| 4,607,256 | 8/1986 | Henzel | 340/825.52 |
| 4,745,598 | 5/1988 | Ulug | 370/89 |
| 4,885,684 | 12/1989 | Austin et al. | 364/300 |
| 4,926,375 | 5/1990 | Mercer et al. | 364/900 |
| 4,951,192 | 8/1990 | Chase, Jr. et al. | 395/700 |
| 4,972,367 | 11/1990 | Burke | 364/900 |
| 5,005,122 | 4/1991 | Griffin et al. | 395/200 |
| 5,008,814 | 4/1991 | Mathur | 395/200 |
| 5,091,849 | 2/1992 | Davis et al. | 395/100 |
| 5,155,847 | 10/1992 | Kirouac et al. | 395/600 |
| 5,193,152 | 3/1993 | Smith | 395/200 |
| 5,442,749 | 8/1995 | Northcutt et al. | 395/200 |
| 5,490,276 | 2/1996 | Doli, Jr. et al. | 395/700 |
| 5,495,610 | 2/1996 | Shing et al. | 395/600 |

FOREIGN PATENT DOCUMENTS

| | | |
|---|---|---|
| 0211420 | 2/1987 | European Pat. Off. ........ G06F 15/16 |
| 3539728 A1 | 5/1986 | Germany . |
| 3619660 A1 | 12/1986 | Germany . |
| 255612 A1 | 4/1988 | Germany . |
| 276551 A1 | 2/1990 | Germany . |
| 3911206 A1 | 10/1990 | Germany . |

OTHER PUBLICATIONS

IBM Technical Disclosure Bulletin, "Micro Channel Common Communications Adapter", pp. 44–46, vol. 34, No. 6, Nov. 1991.

Handbook of LAN Technology, Fortier, Paul J., pp. 24–25, 36–37 and 46–47, Mc–Graw Hill book company, New York, NY, 1989.

*Primary Examiner*—Thomas C. Lee
*Assistant Examiner*—Ki S. Kim
*Attorney, Agent, or Firm*—Antonelli, Terry, Stout & Kraus, LLP

[57] ABSTRACT

A computer system is so configured as to be divided into a control system which should have high reliability and high responsiveness and an information system which does not access the control system. They are connected via a transmission path (transmission path of control system and transmission path of information system). Centralized management of development and maintenance is performed from a software maintenance system. In development and maintenance of software, management according to the feature of each software such as processing contents of each software, demanded reliability, and version up frequency is performed from a maintenance system for exclusive use by using a transmission path of information system. Thereby, development and maintenance having high reliability and expandability is realized.

20 Claims, 34 Drawing Sheets

FIG. 3

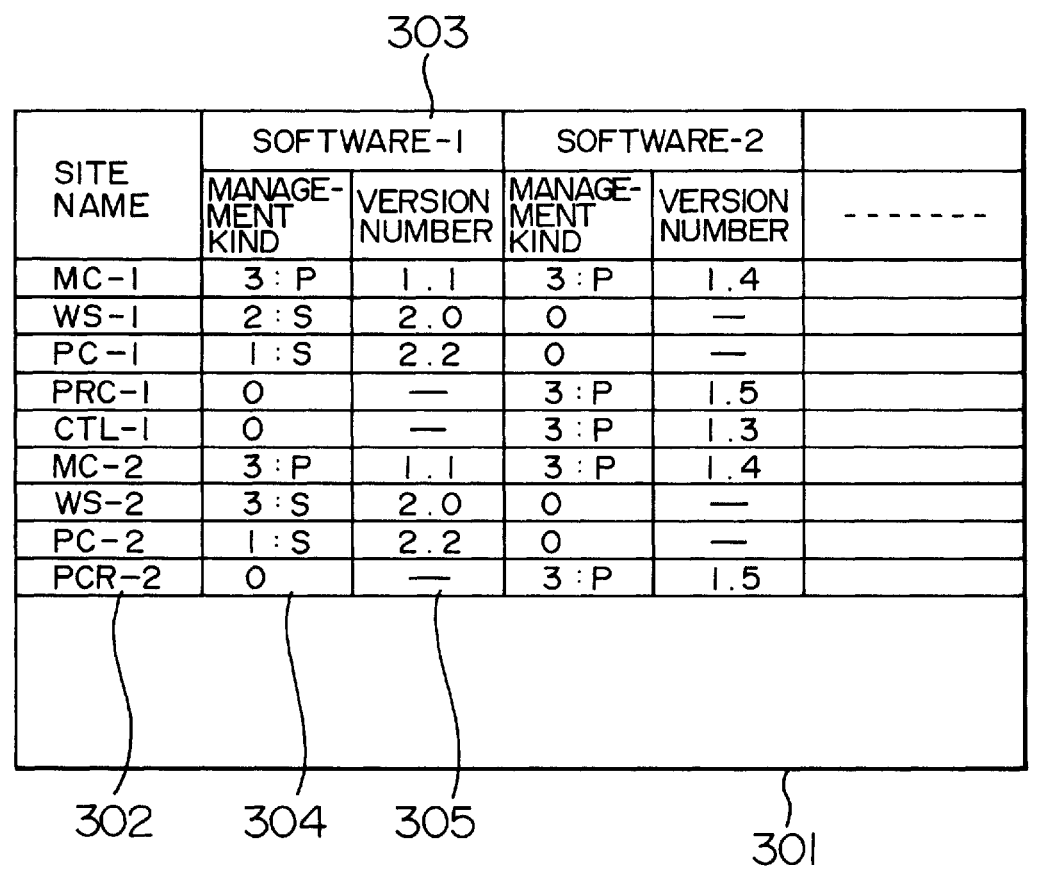

| SITE NAME | SOFTWARE-1 | | SOFTWARE-2 | | -------- |
|---|---|---|---|---|---|
| | MANAGEMENT KIND | VERSION NUMBER | MANAGEMENT KIND | VERSION NUMBER | |
| MC-1 | 3:P | 1.1 | 3:P | 1.4 | |
| WS-1 | 2:S | 2.0 | 0 | — | |
| PC-1 | 1:S | 2.2 | 0 | — | |
| PRC-1 | 0 | — | 3:P | 1.5 | |
| CTL-1 | 0 | — | 3:P | 1.3 | |
| MC-2 | 3:P | 1.1 | 3:P | 1.4 | |
| WS-2 | 3:S | 2.0 | 0 | — | |
| PC-2 | 1:S | 2.2 | 0 | — | |
| PCR-2 | 0 | — | 3:P | 1.5 | |

F I G. 15
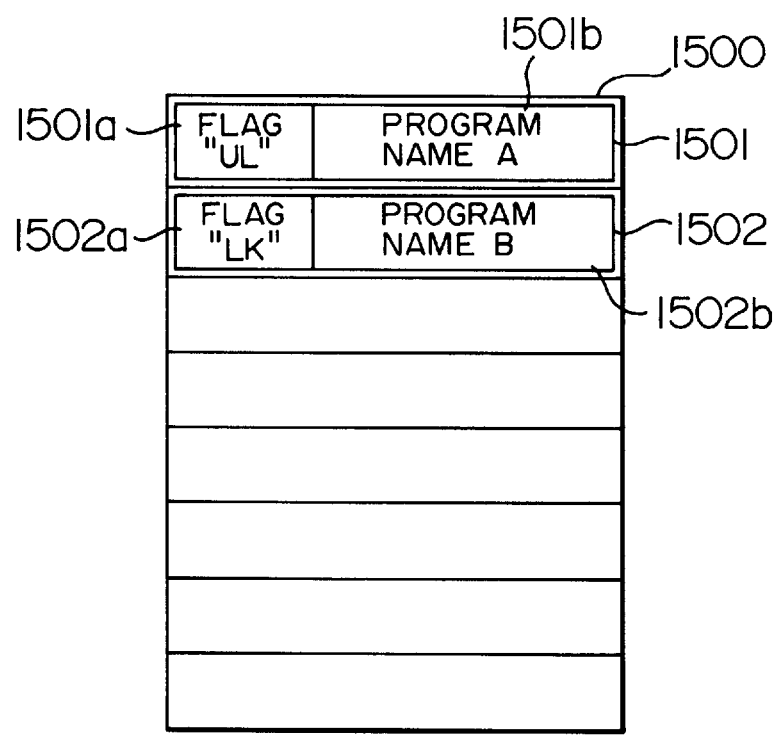

F I G. 18
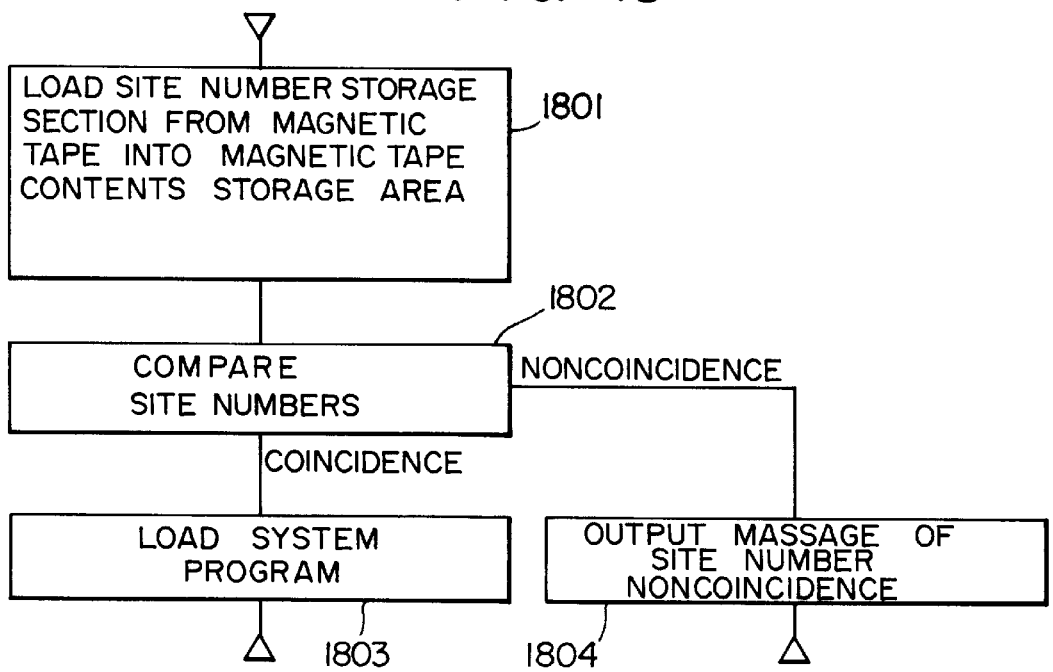
F I G. 19
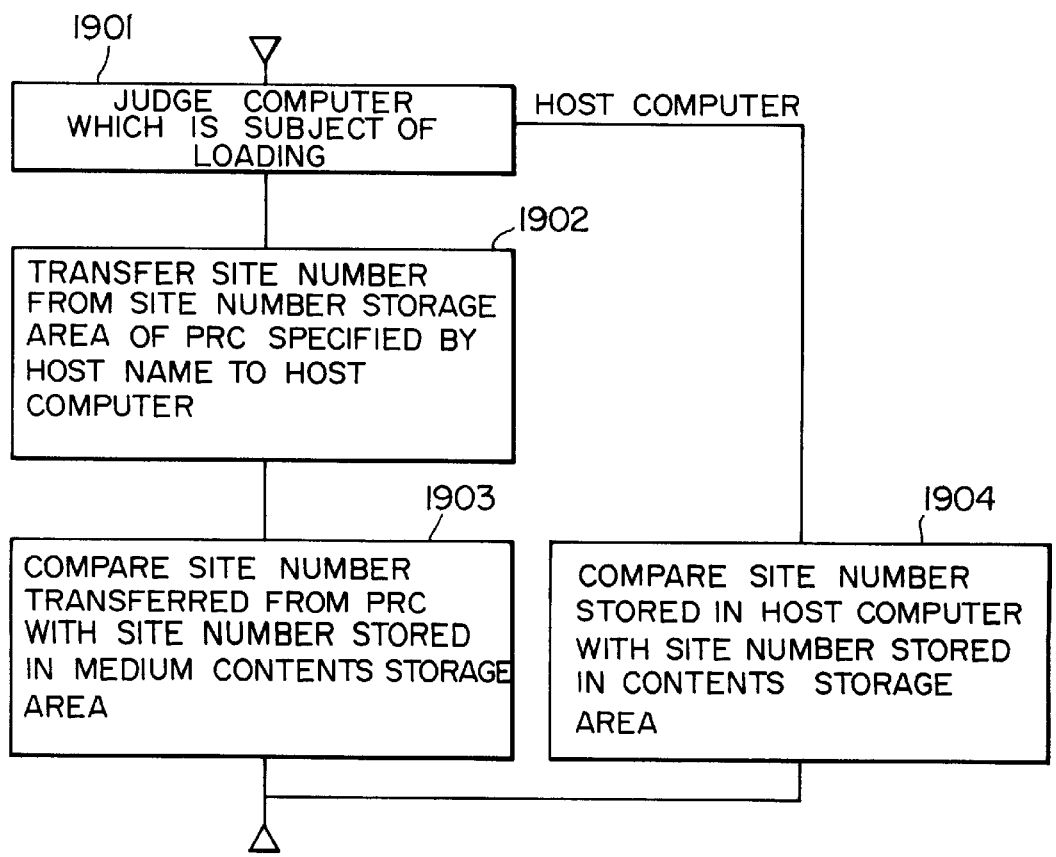

F I G. 23
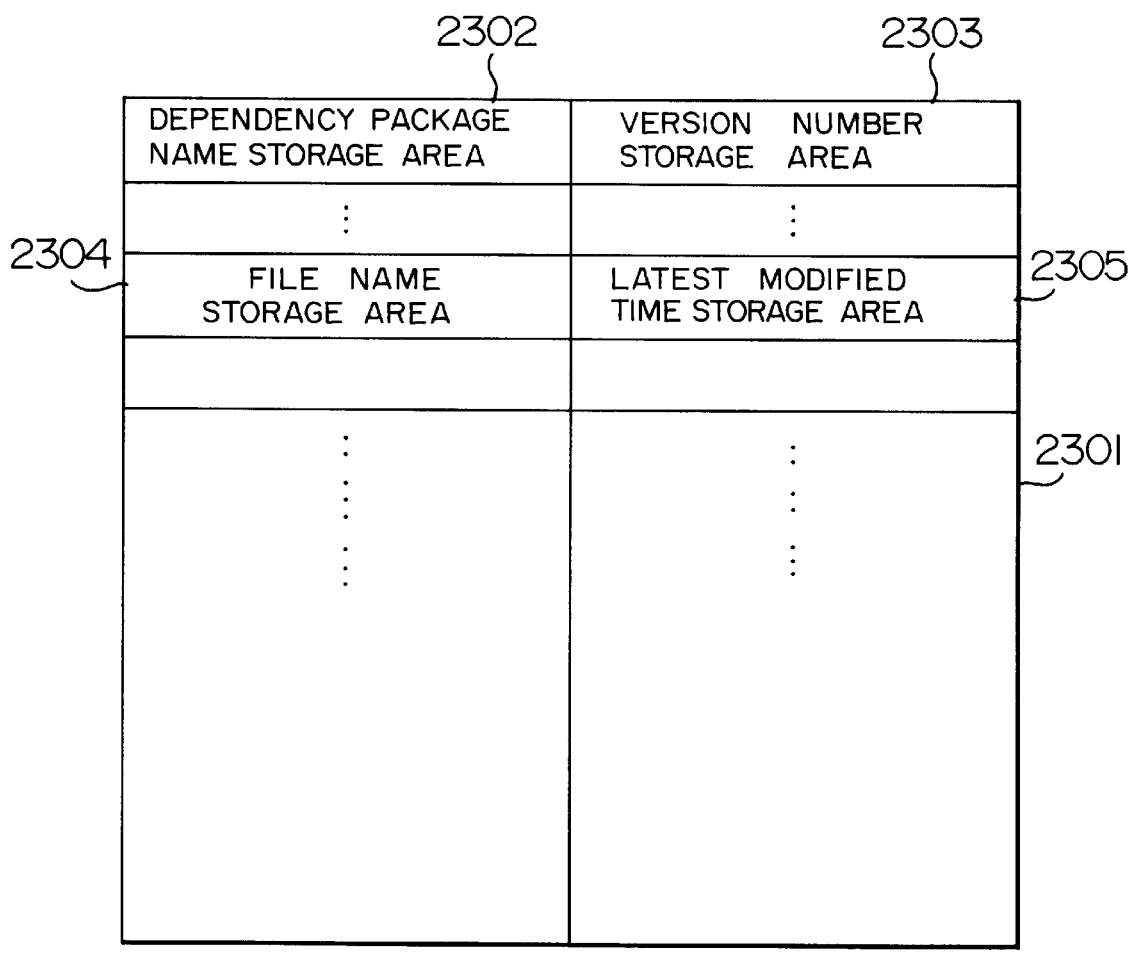

CONFIGURATION DIAGRAM OF FUNCTION OF CHECKING DEPENDENCY RELATION BETWEEN PROGRAMS

PROCEDURE FOR DETERMINING WHETHER PACKAGE CAN BE LOADED BY CHECKING DEPENDENCY RELATION BETWEEN PROGRAMS

PROCESSING OF JUDGING
COMPUTER WHICH IS
SUBJECT OF LOADING

CHANGE PACKAGE
EXTRACTION PROCESSING

PROCESSING FOR DETERMINING WHETHER PACKAGE HAVING DEPENDENCY PACKAGE SET CAN BE LOADED

CONFIGURATION DIAGRAM OF CHANGING FILE LOADING FUNCTION

PROCEDURE FOR LOADING ONLY CHANGE FILES

F I G. 35
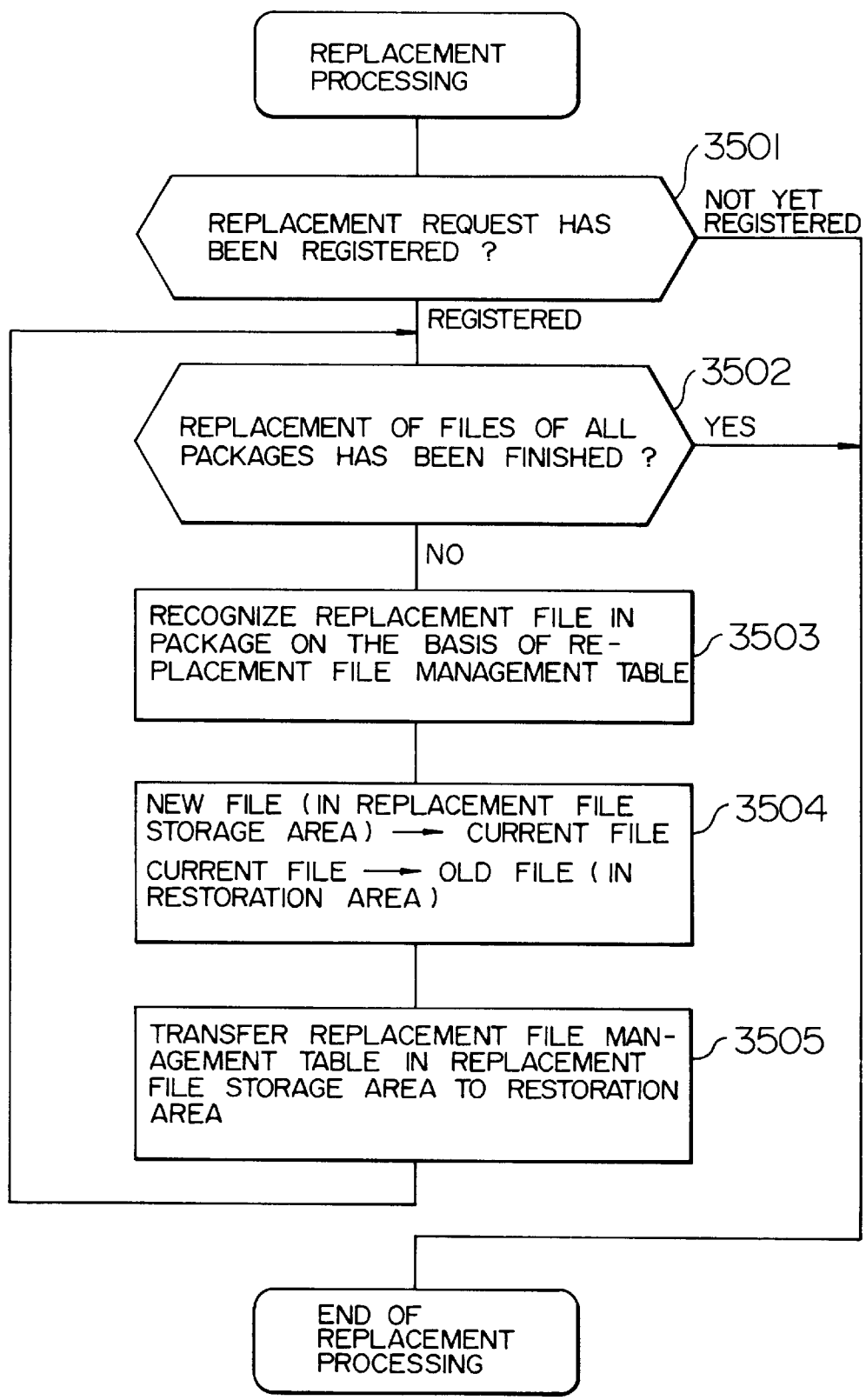

SYSTEM FOR SOFTWARE UPDATE IN MANNER BASED ON PROCESSING PROPERTIES OF DEVICES VIA MAINTENANCE NETWORK WHILE ALLOWING DATA TRANSMISSION BETWEEN DEVICES ON ANOTHER NETWORK

This application is a continuation of application Ser. No. 08/305,758, filed Sep. 14, 1994 now abandoned; which is a continuation of application Ser. No. 07/962,642, filed Oct. 16, 1992, now abandoned.

BACKGROUND OF THE INVENTION

The present invention relates to a network system and its software management method.

As computer application expands, the range affected by faulty operation of computer becomes wider and wider. Therefore, system and software production with high reliability is intensely demanded as a very important subject. For example, in computer systems for control, controlled systems are typically machines and facilities and a slight delay or a slight control mistake might cause a great deal of damage. In some cases, accidents may result in injury or death. High reliability and high responsiveness are thus demanded. Therefore, highly reliable software production (software development and maintenance) is intensely demanded.

On the other hand, highly reliable software production (software development and maintenance) needs sufficient check and time, efficiency improvement in development and maintenance being hindered. As a result of pursuit of high reliability excessively, software development and maintenance often lack expandability and flexibility. As a result, highly reliable software increases the system cost. At the time of system enlargement or reconstruction, a further enormous investment is needed for software development and maintenance, resulting in problems of insufficient efficiency improvement, expandability, and flexibility.

In this regard, JP-B-2-23887 discloses a technique whereby system stop caused by software maintenance is avoided in one computer by making possible maintenance of program in operation.

However, application to the entire network system is not considered.

In the above described prior art, application to the entire network system is not considered. For the purpose of pursuit of higher reliability, therefore, nonstop replacement is applied to the entire network system uniformly, resulting in an increased operational cost and increased replacement program storage areas. Further, since application to the entire network system is not considered, the program maintenance method of the entire network system is indefinite. This results in problems such as occurrence of program loading mistakes with a computer taken as the unit. The cost of production of a highly reliable network system in development and maintenance is increased as higher reliability is pursued and as the scale of the network system is expanded. Further, the network system lacks flexibility and expandability in some cases.

SUMMARY OF THE INVENTION

An object of the present invention is to realize management specifications, which are demanded of development and maintenance of respective softwares, so as to correspond to respective softwares and provide a network system and its software management method having reliability, expandability and flexibility.

In accordance with a feature of a configuration and its software management method according to the present invention for achieving the above described object, all softwares are not handled uniformly in case a plurality of softwares of different natures are to be developed and maintained in a network system, but softwares are managed according to features of respective softwares such as processing contents, demanded reliability, and version up frequency of respective softwares.

In accordance with the present invention, a network system is divided into a control system demanded to have high reliability and high responsiveness and an information system with regard to processing contents and demanded reliability of the network system. Softwares of respective systems are managed by using different methods (such as bulletin board method, broad cast method, and down load method, respectively). Thereby it is possible to prevent increase of the operational cost due to time loss at the time of business stop caused by increased replacement for all computers of a new source and at the time of occurrence of system business stop. The operational cost of the network system can thus be reduced.

Further, in the processing of the network system as well, the influence upon the processing of the control system in development and maintenance is avoided by classifying the processing of the network system into processing of the control system and processing of the information system and by separating transmission paths used for respective kinds of processing (such as transmission path 231 of the control system and transmission path 232 of the information system shown in FIG. 2).

Further, a computer dedicated to software maintenance is provided to exercise concentrated management of softwares of computers included in the system. Efficient development and maintenance are thus realized.

Further, in the control system as well, concentrated management of user program and system program is exercised in the software maintenance computer. And it is made possible to restrict machines which are the subject of program maintenance and return to the state preceding execution of maintenance. Thereby, highly reliable development and maintenance of the control system is realized.

BRIEF DESCRIPTION OF THE DRAWINGS

FIG. 3 is a diagram showing the configuration of a software distribution management table according to an embodiment of the present invention;

FIG. 15 is a diagram showing the configuration of a replacement indication file according to an embodiment of the present invention;

FIG. 18 is a diagram showing loading processing according to an embodiment of the present invention;

FIG. 19 is a diagram showing site number comparison processing according to an embodiment of the present invention;

FIG. 23 is a diagram showing the configuration of a file list file according to an embodiment of the present invention;

FIG. 35 is a diagram showing system program replacement processing according to an embodiment of the present invention;

DESCRIPTION OF THE PREFERRED EMBODIMENTS

Figure 1:
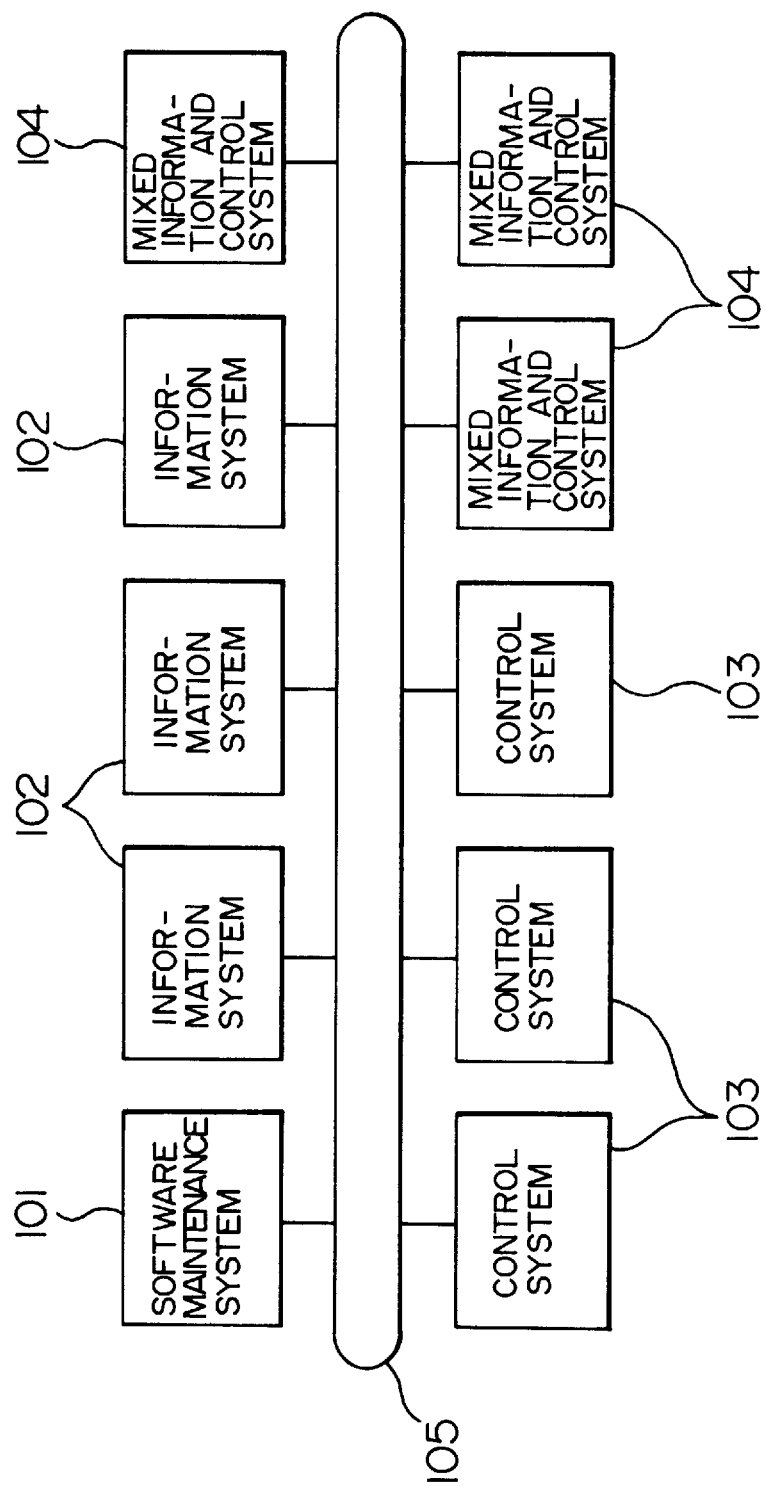
FIG. 1 is a diagram showing the system configuration according to an embodiment of the present invention.

FIG. 1 shows the system configuration of an embodiment of the present invention.

In the present embodiment, the case where two kinds of processing of different natures (processing of the control system and processing of the information system) are performed in the network system.

FIG. 1 shows the configuration of a composite decentralized control computer system capable of exercising centralized management of softwares of a plurality of distributively disposed information systems 102, control systems 103 and mixed information and control systems 104 by using one software maintenance system 101. Each of the above described systems includes a transmission path functioning as the network, and processing devices such as a host computer and terminal devices connected via this transmission path. As a whole, a network system including a plurality of networks and a plurality of processing devices is configured. In the control computer system as well, one computer system must perform not only processing of the control system but also processing of the information system in the same way as other computer systems as the application range is expanded. In actual application, the processing of the information system and the processing of the control system must be discriminated. As the discrimination condition, processing of the information system and processing of the control system are defined below.

The processing of the information system refers to processing whereby the data base associated with the controlled system is not rewritten and the controlled system is not directly accessed.

The processing of the control system refers to processing whereby the data base associated with the controlled system is rewritten and the controlled system is directly accessed.

The present embodiment is featured by that software is divided into some groups or kinds. The above described discrimination condition is nothing but one example. In case discrimination conditions of the processing of the information system and the processing of the control system are to be determined for each individual system in actual operation, it is a matter of course that the present invention can be applied even if conditions other than the above described discrimination condition is used.

The computer system of FIG. 1 includes the software maintenance system 101 for exercising centralized management of software of the entire system, the information system 102 for performing the processing of the information system, the control system 103 for performing the processing of the control system, the mixed information and control system 104 for performing mixed processing of the information system and the control system, and the network 105 for connecting those systems.

The software maintenance system 101 has a centralized function of exercising management of version and revision of software included in the entire system, management of change history, management of program loading, and management of names. Software development may be performed by this software maintenance system 101. Or software development may be performed by the information system 102, the control system 103, or the mixed information and control system 104.

The information system 102 is a computer system for performing processing which does not directly relates to "control" such as informing the operator of the state of a plant to be controlled by displaying the plant state, and creation and editing of statistical information relating to plant data. ("Production and editing of statistical information relating to plant data" means production of image data and calculation of statistical data. After the production or calculation, the image data are registered or the calculated statistical data are registered into the data base by means of the processing of the control system.)

The control system 103 is a computer system for performing processing of the control system to issue a control command directly to the controlled system. The mixed system 104 is a computer system having a mixture of processing of the information system and processing of the control system within a single system.

Figure 2:
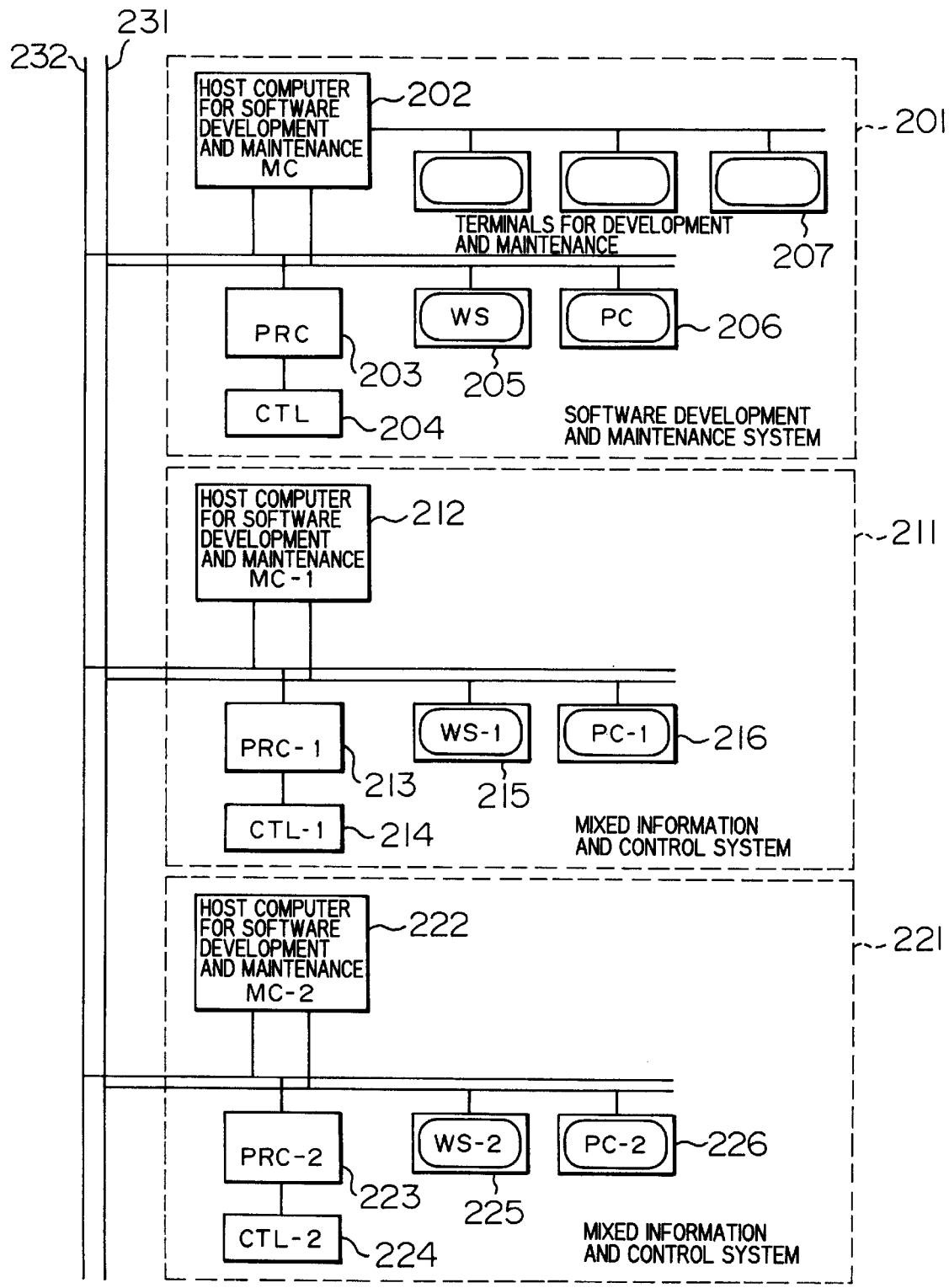
FIG. 2 is a diagram showing a concrete example of system configuration according to an embodiment of the present invention.

FIG. 2 shows an example of configuration including one software development and maintenance system 201 and a plurality of mixed information and control systems 211 and 221.

The two mixed information and control systems 211 and 221 have the same configuration. Respective systems are connected to the network and can communicate with the software development and maintenance system 201 or another mixed system 211 or 221.

The mixed information and control system 211 includes a minicomputer (hereafter abbreviated as MC-1 ) 212 for exercising the general management of that system 211, a process control computer (hereafter abbreviated as PRC-1) 213 for exercising the general management of the processing of the control system, a controller (hereafter abbreviated as CTL-1) 214 for directly controlling the plant, and a work station (hereafter abbreviated as WS-1) 215 and a personal computer (hereafter abbreviated as PC-1) 216 for sharing processing of the information system such as plant state display.

The mixed information and control system 221 includes a minicomputer (hereafter abbreviated as MC-2) 222 for exercising the general management of that system 221, a process control computer (hereafter abbreviated as PRC-2) 223 for exercising the general management of the processing of the control system, a controller (hereafter abbreviated as CTL-2) 224 for directly controlling the plant, and a work station (hereafter abbreviated as WS2) 225 and a personal computer (hereafter abbreviated as PC-2) 226 for sharing processing of the information system such as plant state display.

The software development and maintenance system 201 has both development function and maintenance function in order to allow not only the software maintenance of the entire computer system but also the software development in one place. Further, the software development and maintenance system 201 has a configuration similar to that of the above described mixed system 211 or 221 so that test debugging may be performed in an environment close to that of actual machines at the time of software development and maintenance for the above described mixed system 211 or 221. However, the software development and maintenance system 201 is different from the mixed system 211 or 221 in that terminals 207 for development are connected for the purpose of software development and maintenance.

The principle of software development and maintenance in the present system will now be described.

In the present system, control processing and information processing are mixedly present in a single system. However, the entire system is exactly divided into the control system and the information system. The control system must be so constructed as to be highly reliable. In the management of software of the control system, reliability is more important than convenience of use. On the other hand, the minimum requirement for the information system is that it must not give disturbance to the control system.

To be concrete, firstly, hardware division is performed. In the embodiment shown in FIG. 2, for example, the processing devices are divided between the information system for performing processing of the information system and the information system for performing processing of the control system. That is to say, WS1 (215), WS2 (225), PC-1 (216) and PC-2 (226) are dedicated to the information system, whereas PRC-1 (213), PRC-2 (223), CTL-1 (214) and CTL-2 (224) are dedicated to the control system. Thus separative operation is conducted. Further, two networks, i.e., LAN231 for the information system and LAN232 for the control system are prepared to reduce mutual interference between both systems. That is to say, it becomes possible to reduce the line load and prevent data destruction due to false communication. In the present embodiment, the LAN231 of the information system is used as LAN for program maintenance in order to prevent disturbance to the control system. Secondly, the processing in the computer is also distinctly divided between the control system and the information system. For example, both kinds of processing are not incorporated into one program, but are separated as programs operating separately.

Thirdly, as for the software development and maintenance as well, supports for the software of the control system are distinctly separated from supports for the software of the information system. This will hereafter be described.

The flow of software development and maintenance typically includes producing a source, generating a program by means of compiling and linking, performing test debugging, and thereafter loading the program into a site needing it. From this flow, resources to be managed are the source, program and site. Concrete management methods for respective resources to be managed will hereafter be described.

Herein, the "source" means a file written by means of a high-level language which has not been compiled yet. The "program" means a file which has already been compiled, and it is an object module or an execute module.

(1) Software management of information system (source/program/site)

The information system has man-machine interface in the center. It is important to attempt to improve the performance and function while taking in new kinds of machines and software. Therefore, PC and WS are adopted.

In the software management as well, therefore, convenience of use, expandability and flexibility are important. As for the management method, comparatively loose management method using control means having the lowest necessary level is advantageous in both economy and expandability.

In the present embodiment, three kinds of management methods, i.e., (a) bulletin board method, (b) broadcast method, and (c) download method, are prepared so as to allow selection for each site/software. Details will hereafter be described by referring to FIG. 2.

In the system of FIG. 2, every software in the system is subjected to concentrated management in the software development and maintenance center 202. As an example of the software management of the information system, a case having the site name PC-1 will now be described.

In the present embodiment, it is assumed that every software of the information system is managed on the basis of the source. That is to say, if the latest software has been completed, distribution of the source is made the basis.

In case of the above described bulletin board, the MC (host computer for software development and maintenance) 202 informs the PC-1 (216) that the latest software has been completed via electronic mail, dedicated communication means, or the like. If the above described latest software is necessary, the user of the PC-1 (216) copies the source of the MC 202 into the PC-1 (216).

In the above described broad cast method, the MC 202 unconditionally distributes the source of the latest software to the PC-1 (216). If the PC-1 (216) needs that source, the PC-1 (216) stores it. If the source is unnecessary, the PC-1 (216) discards it.

The above described down load method is a method of managing the destination of distribution in the MC 202. Which version of source of which software has been distributed to the PC-1 (216) is managed by the MC 202.

FIG. 3 shows the configuration of a management table for managing the distribution of software.

The software distribution management table 301 is present in the MC 202 and is a table for managing software and its version and revision distributed to respective sites.

In a site name field 302, site names managed by the software distribution management table 301 are stored. In a software name field 303, names of all softwares in the system managed by the software distribution management table 301 are stored as "software-1, software-2, . . . ". This software name field 303 is further divided into two parts, i.e., a management kind field 304 and a version number field 305. The management kind of the above described software and the identification information of matter to be distributed are stored in the management kind field 304. As for the management kind, the above described bulletin board method, broad cast method, and down load method are denoted by 1, 2 and 3, respectively. As for the matter to be distributed, source and program (having execute form) are denoted by S and P, respectively. Two kinds of information are marked off by a colon and then stored. For example, "3; P" means that program is to be distributed by using the down load method. In the version number field 305, the version number and the revision number of the pertinent software are marked off by a period and stored. For example, "2. 0" represents version number 2 and revision number 0.

It is now assumed that a source having the software name "software-1" shown in FIG. 3 has been updated and the latest source has been completed. Sequential search is made in the site name field 302 of the software distribution management table 301. Software-1 is distributed in specified forms to sites having values other than "0" in the management kind field 304 corresponding to the software-1. In the management kind field 304, "0" means that distribution of the pertinent source is unnecessary. Given the software distribution management table 301 shown in FIG. 3, program distribution is performed by means of the download method for the site names MC-1 and MC-2, by means of the broadcast method for the site name WS1, and by means of the bulletin board method for the site name PC-1. At the time of distribution, the version number of the software which has been distributed is stored in the version number field 305 of the pertinent software, i.e., the software-1 in case of FIG. 3, in the software distribution management table 301.

By using the method heretofore described, version/revision management of software of the information system becomes possible. Herein, software of the information system is managed by means of source uniformly. Alternatively, whether management is exercised by means of source or by means of execute form (program) can be selected for each site/software.

Further, the software of the control system can be managed by a method similar to the present method. In case of the software of the control system, however, higher reliability and availability are demanded. Therefore, an embodiment based upon this point will hereafter be described.

(2) Software management of control system

In order to realize high reliability and availability in the maintenance of software of the control system, the present embodiment has the following functions.

(a) Site management function

Each of computers such as PC, PRC and WS included in the system is called site. One site is provided with one name. This is called site name and used to identify the site. In the site management function of the present embodiment, registration and deletion of site names are managed. In the site management function of the present embodiment, program attributes such as name of software stored in each site, version and revision, occupation size in the memory, and resident (which means that the program is stored on the main memory) or nonresident (which means the program is read from an external memory such as a disk every time the program is started) are also managed. In the network computer system, the site management function makes it possible to immediately discriminate the version and revision of each site and thereby prevent a mistake at the time of program replacement.

(b) Program loading management function

Programs included in one computer system are broadly classified into user programs and system programs.

The system program is basic software for operating the computer and is common to the entire computer system. On the other hand, the user program is implementation of processing, which is required to use one computer system for a particular use, in the form of program and differs from individual computer system to individual computer system.

Description will hereafter be made by referring to embodiments 1 to 8. Summaries of respective embodiments will now be described.

1) Embodiment 1: Prior loading function of the user program is explained.

2) Embodiment 2: Restoring function to the state preceding the user program replacement is explained.

3) Embodiment 3: Restricted function of the loading computer at the time of system program loading is explained.

4) Embodiment 4: Site number check function at the time of system program loading is explained.

5) Embodiment 5: Advance loading function of the system program is explained.

6) Embodiment 6: Function of checking the dependence relation between system programs is explained.

7) Embodiment 7: Loading and replacement of only a changed file at the time of system program replacement are explained.

8) Embodiment 8: Function of restoring the state preceding the system program replacement is explained.

Further, each of program replacement means for shortening the stop interval of the system (embodiment 2 and embodiment 5), means for restoring the original state upon occurrence of failure at the time of program replacement (embodiment 2 and embodiment 8), means for preventing a system fault due to a specification mistake of the subject site (embodiment 3 and embodiment 4), means for checking other programs relating to replacement of one program (embodiment 6), and means for replacing only changed portions in order to reduce the disturbance to the system in operation (embodiment 7) will now be described.

Embodiment 1:

Embodiment 1 is an example in which during online operation the host management computer connected via the network exercises management so as to associate the version of the system of the computer PRC with the version of the program included in that computer system.

Figure 4:
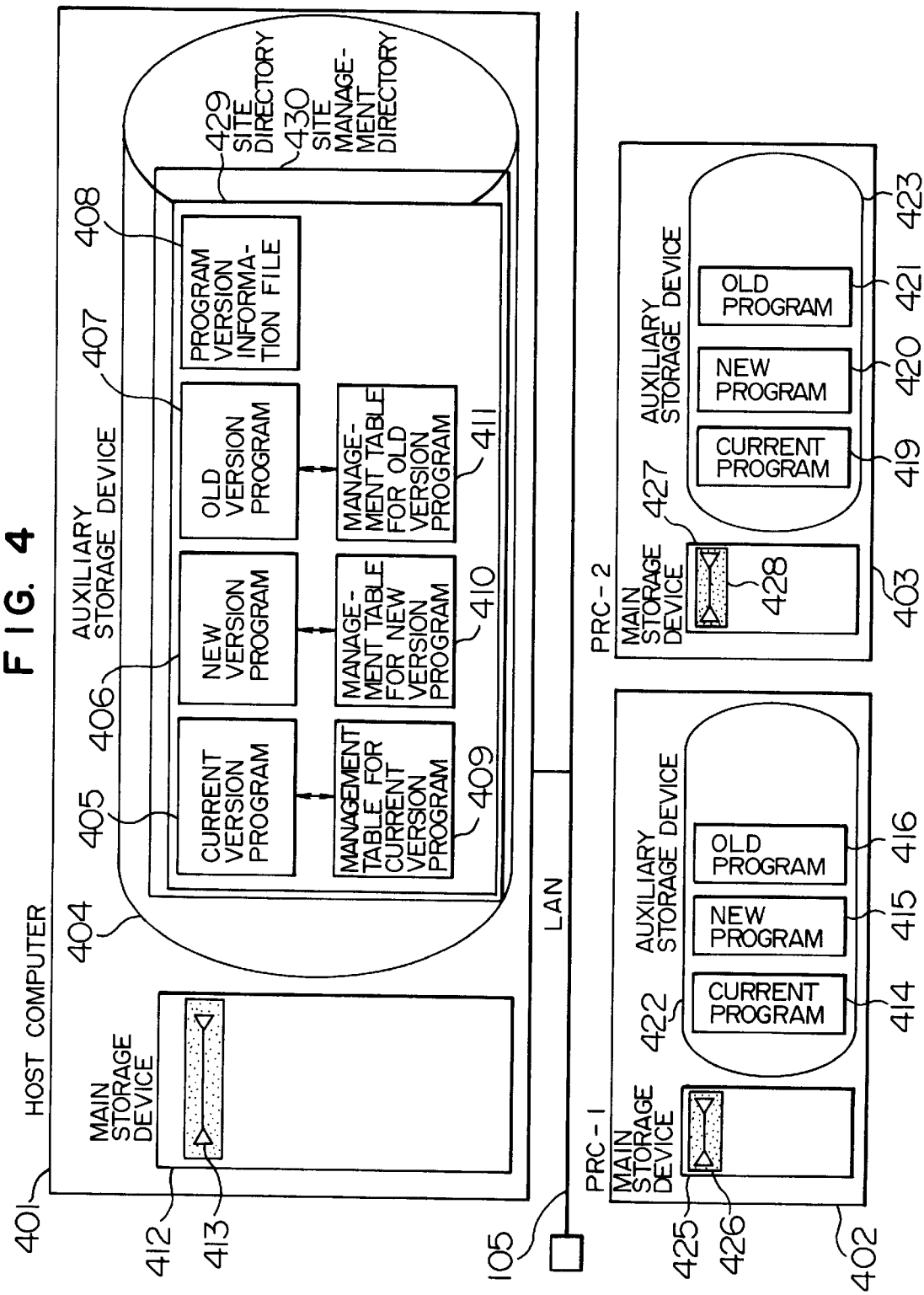
FIG. 4 is a diagram showing the system configuration according to an embodiment of the present invention.

FIG. 4 is a configuration diagram of the embodiment 1. In this system, a host computer 401 for developing programs is connected to PRC-1 (402) and PRC-2 (403) for performing on-line control via LAN 105 which is a network medium. A host computer 401 for program development includes an auxiliary storage device 404 and a main storage device 412 storing program 413 for exercising version management. In the auxiliary storage device 404, there are stored current version program 405 corresponding to current programs (414, 419) of version of the system now in operation stored in auxiliary storage devices 422 and 423 of respective PRCs, old version program 407 corresponding to old programs (416, 421) associated with the old version system, new version program 406 corresponding to new programs (415, 420), a management table 409 for current version program for managing the current version program 405, a management table 410 for new version program for managing the new version program 406, a management table 411 for old version program for managing the old version program 406, a program version information file 408, a site directory 429 for managing these programs, and a site management directory 430 for managing this site directory 429.

The main storage devices 425 and 427 of the PRC-1 (402) and PRC-2 (403) include programs 426 and 428 for exercising version management, respectively.

Figure 5:
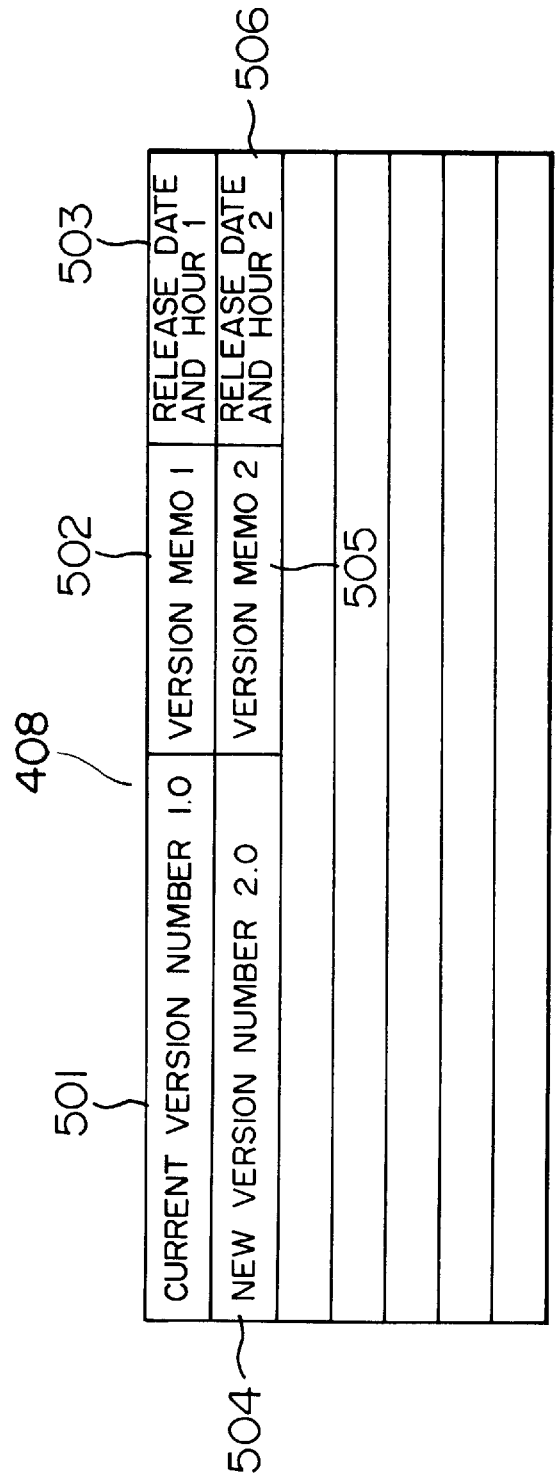
FIG. 5 is a diagram showing the configuration of a program version information file according to an embodiment of the present invention.

FIG. 5 shows the configuration of the program version information file 408 included in the above described configuration. In the program version information file 408, there are stored a current system version number 501, a version memo 502 of the current version, and release date and hour 1 (503) of the system version number 501 are stored. When version update of this system has occurred, a system version number 504 of a new version, a version memo 505 of the new version, and release date and hour 2 (506) of the system version number 504. Thereby version history of each system can be managed.

Figure 6:
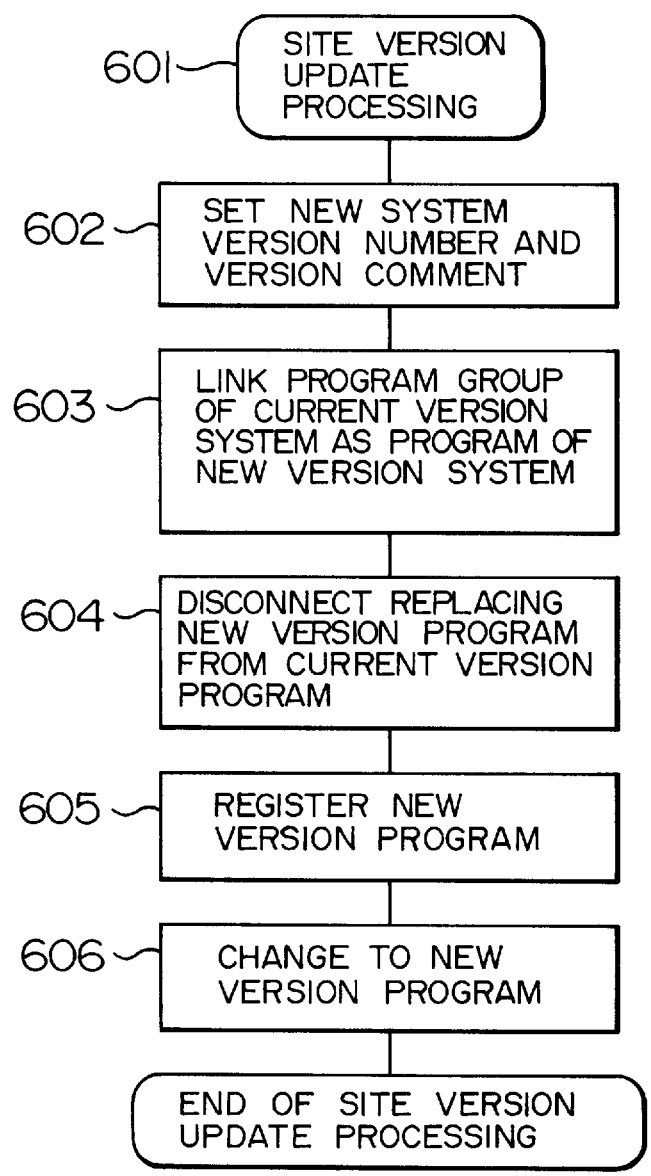
FIG. 6 is a diagram showing a site version update procedure according to an embodiment of the present invention.

FIG. 6 shows a site version update procedure. Site version update processing 601 includes processing 602 for setting the version number of a new system and a comment for the version, and processing 603 for linking a program group of the system of the current version as program of the new version system. The base of the new version is thus produced. Thereafter, processing 604 for disconnecting the current version program to be replaced as the new version, and processing 605 for registering program of the new version are conducted. By processing 606 for changing over to the new version program, the update processing of site version is completed.

Figure 7:
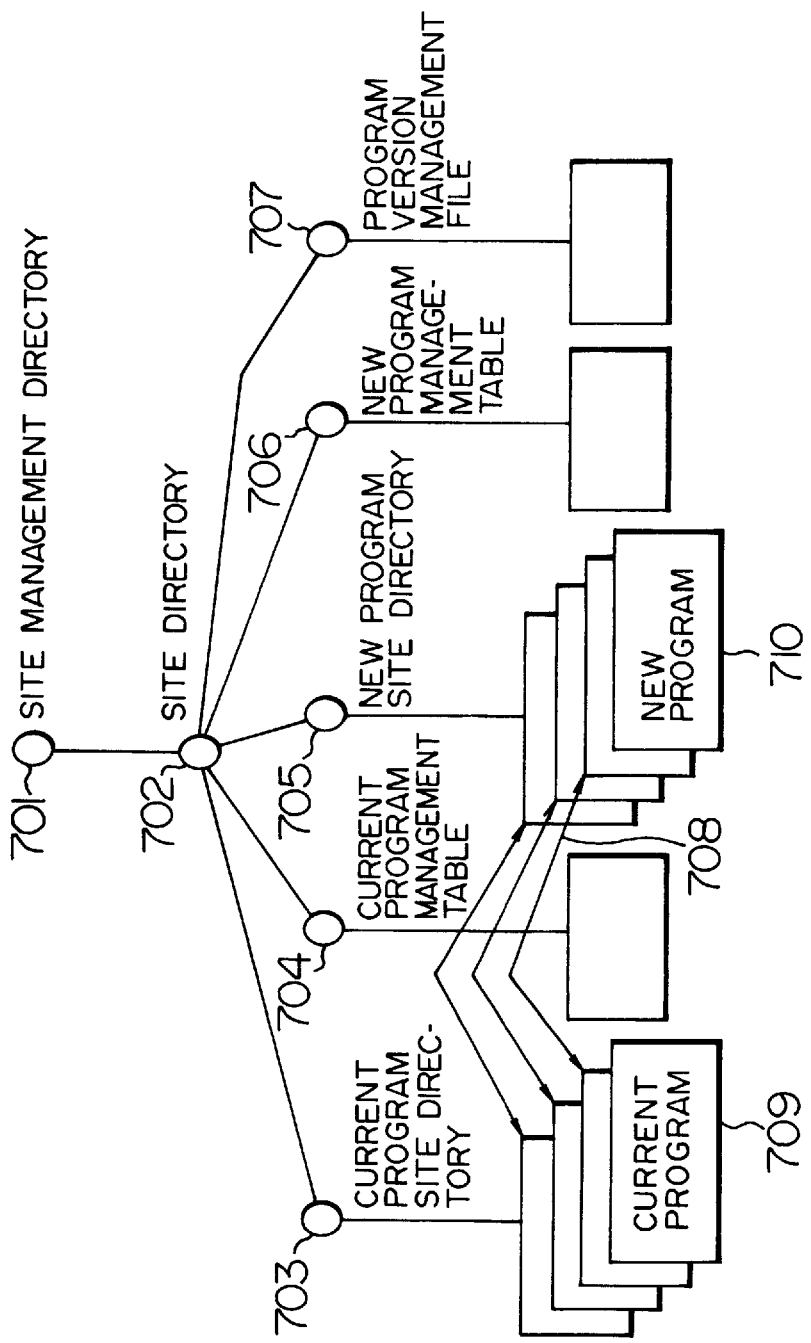
FIG. 7 is a diagram showing the configuration of a site management table according to an embodiment of the present invention.

FIG. 7 shows a configuration diagram of a concrete site management table. In a site management directory 701, a site directory 702 is disposed. Under it, a current program site directory 703 and a current program management table 704 are disposed. In case a new version is to be created, a new program directory 705 and a new program management table 706 are produced, and information of programs 709 and 710 of respective versions is managed by a program version management file 707. In the new program 710, the same contents as those of the current program 709 are used by conducting link processing 708. With regard to only contents to be newly replaced, the current program 709 is disconnected and the new program 710 is registered. Thereby, it is possible to exercise version management of the programs 709 and 710 corresponding to respective versions independently.

Figure 8:
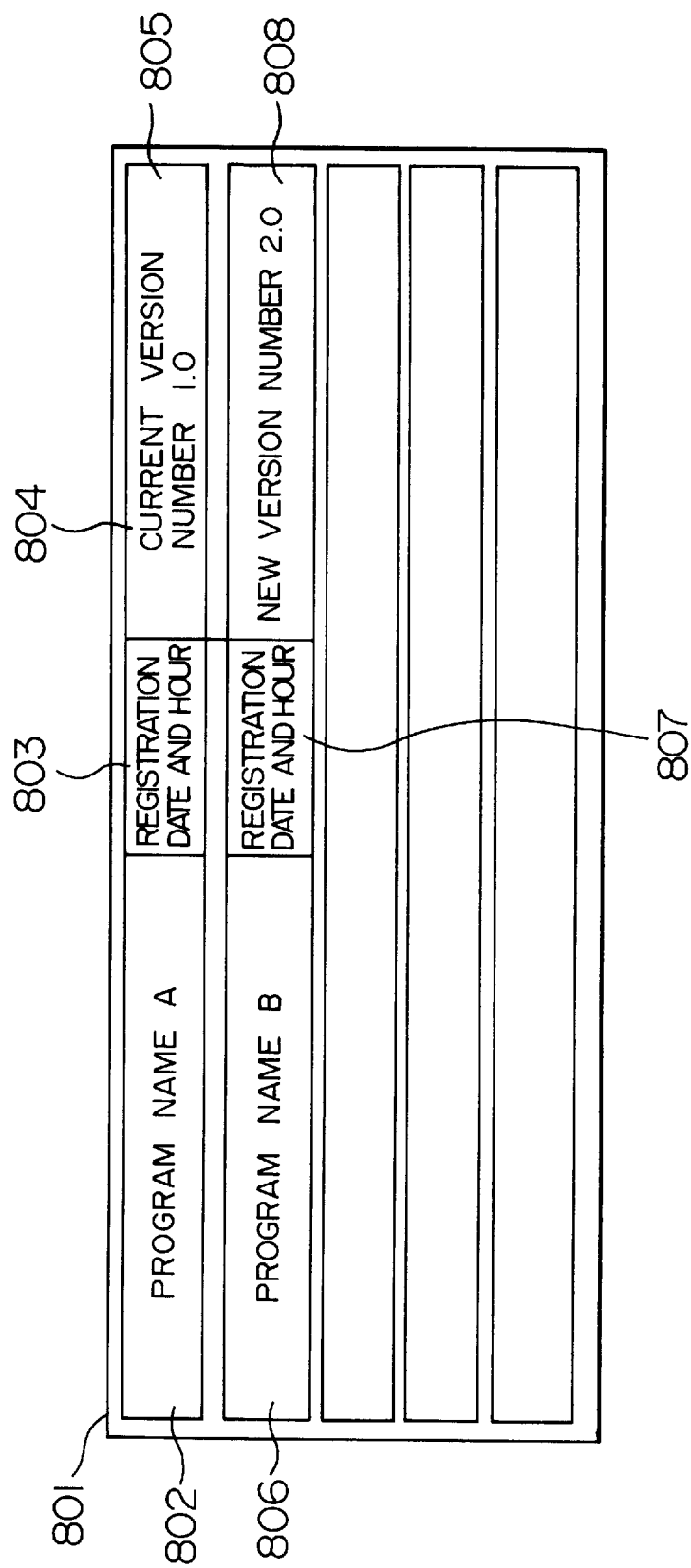
FIG. 8 is a diagram showing the configuration of a program management table according to an embodiment of the present invention.

FIG. 8 shows the configuration of a program management table which can be used in FIG. 7. In the program management table 801, numeral 803 denotes registration date and hour whereat program having "A" as program name 802 has been registered, and numeral 805 denotes current version number of the system in which the present program has been actually registered. In the current version number 805, "1. 0" is indicated. Further, numeral 807 denotes registration date and hour whereat program having "B" as program name 806 has been registered, and numeral 808 denotes new version number of the system in which the present program has been actually registered. In the new version number 808, "2. 0" is indicated. As heretofore described, it is possible to associate a system version number with a program included in the system.

Figure 9:
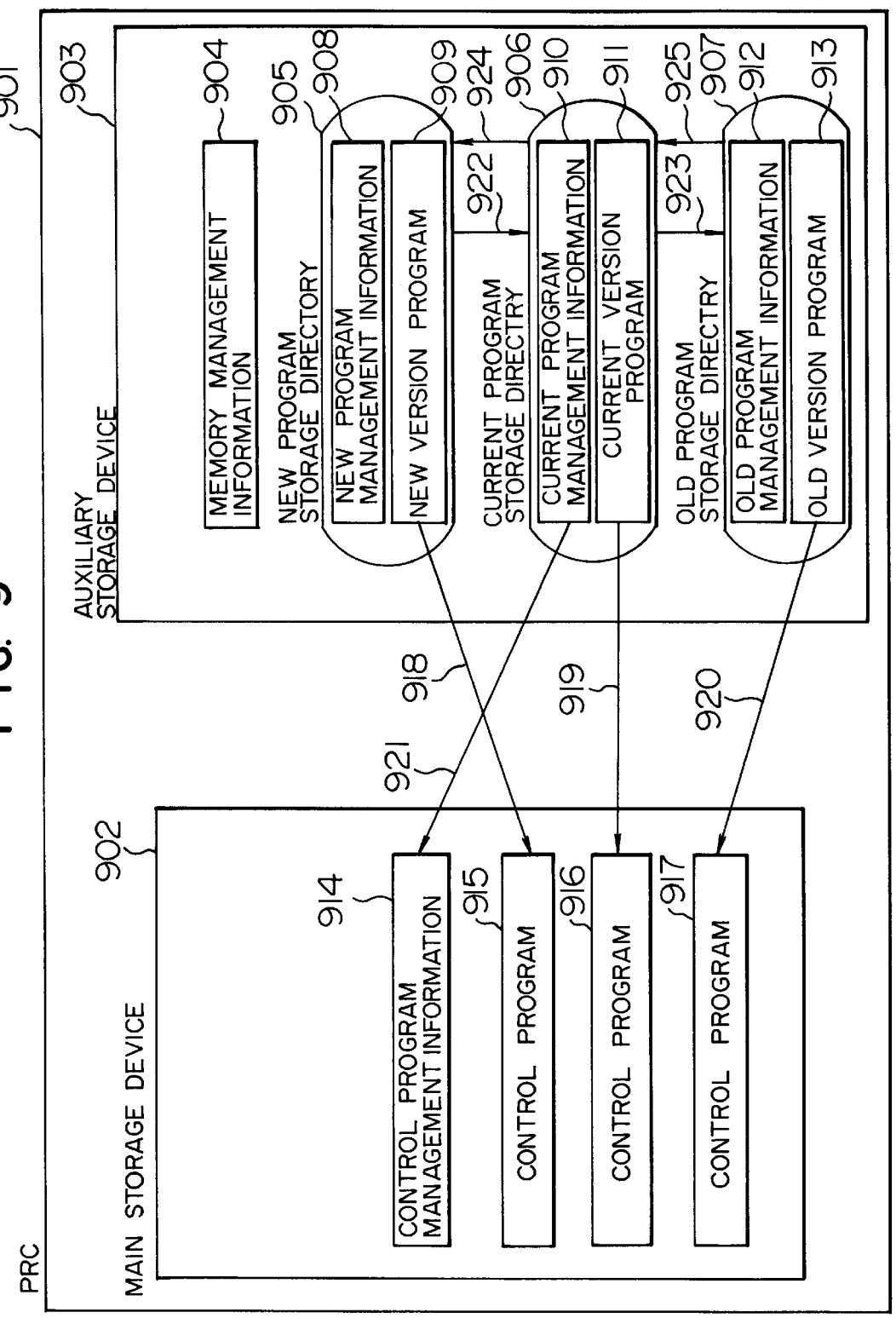
FIG. 9 is a diagram showing the configuration of a PRC according to an embodiment of the present invention.

Embodiment 2:

Embodiment 2 is an example of PRC program replacement in which advance loading of a new version program is performed, the new version program is reflected to the execute program, and the state before program replacement is restored. FIG. 9 is a configuration diagram of the PRC.

The PRC includes a main storage device 902 and an auxiliary storage device 903. Further, the PRC is connected to the host computer via the transmission path.

On the auxiliary storage device 903, there are disposed memory management information 904, a new program storage directory 905 for storing a new version program 909 and new program management information 908, a current program storage directory 907 for storing a current version program 911 and current program management information 910, and an old program storage directory 907.

On the main storage device 902, there are disposed control programs 915, 916 and 917, and control program management information 914. The loading program management information 914 on the main storage device 902 is obtained by loading the current program management information 910 from the auxiliary storage device 903 onto the main storage device 902 by means of loading processing 921. The control programs 915, 916 and 917 on the main storage device 902 are obtained by loading respectively the new version program 909, the current version program 911, and the old version program 913 from the auxiliary storage device 903 to the main storage device 902 by means of loading processing 918, 919 and 920, respectively.

In the PRC, existence of the current version program is indispensable. However, existence of the new version program and the old version program is not indispensable. If the control programs 915, 916 and 917 are the same programs, storage positions on the main storage device 902 are made the same. Thereby the storage capacity can be reduced.

Figure 10:
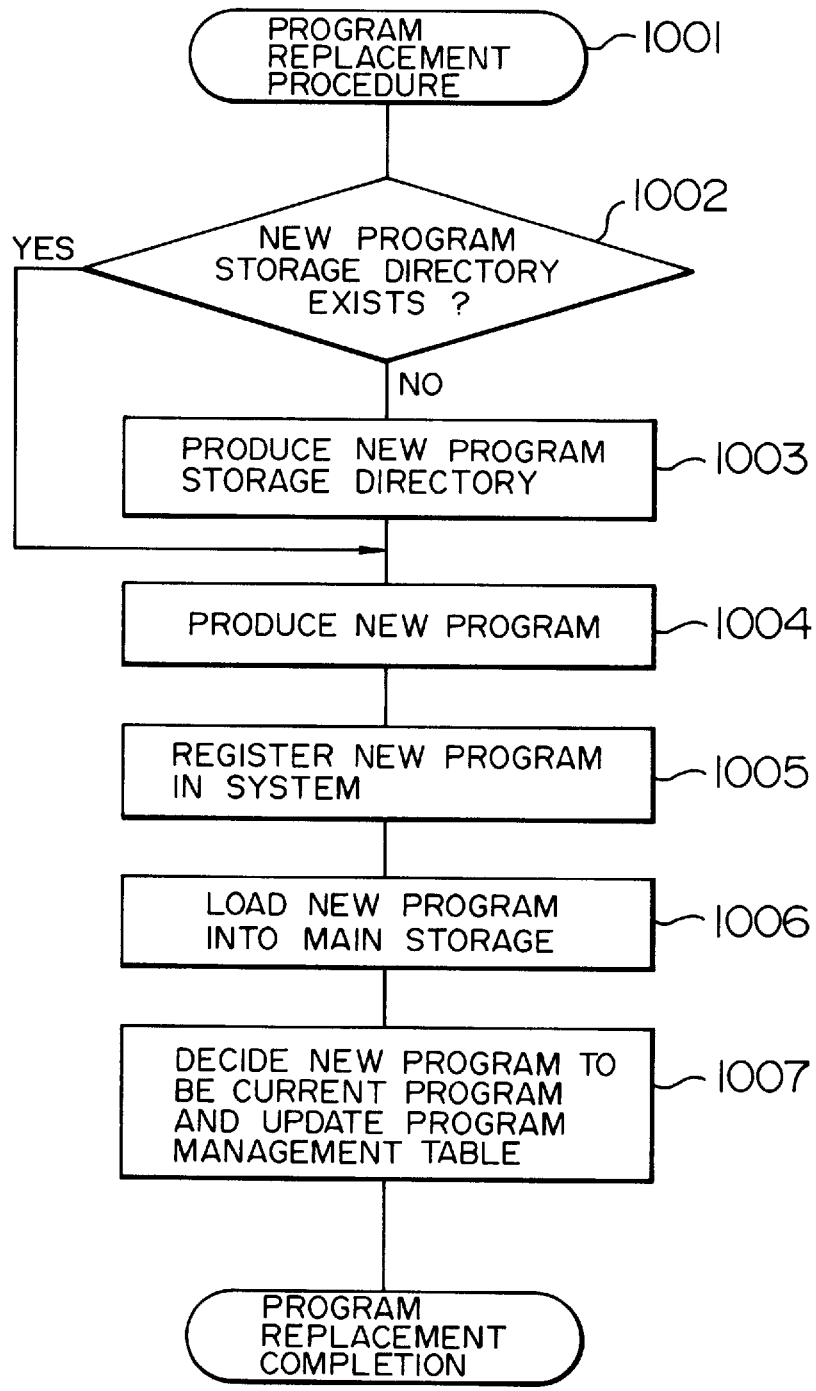
FIG. 10 is a diagram showing advance loading processing according to an embodiment of the present invention.

FIG. 10 shows a procedure 1001 for producing a new version program 909, registering it as a current version program 911, and making it the execute program 916 on the main storage device 902 by using the configuration of FIG. 9. First of all, it is determined in processing 1002 whether the new program storage directory 905 exists. If the new program storage directory 905 does not exist, preparations for registration are made by processing 1003 for producing the new program storage directory. The new version program 909 before registration is identical with the current version program 911. Hence the new program management information 908 is produced by reproducing the current program management information 910. Therefore, the control programs 915 and 916 are disposed at the same address.

Thereafter, source production and compilation of the new version program 909 are performed to produce a new program in processing 1004. In processing 1005, the disposition address of the produced new version program 909 is determined on the basis of the memory management information 904 and the new program management information 910 is updated to register the new program into the system.

Thereafter, the new version program 909 is loaded into the main storage device 902 by means of loading processing 918 and decided to be the control program 915. Processing 1006 for loading the program into the main storage device is thus performed.

Finally, the current program storage directory 906 is changed to a new old storage directory 907 by means of processing 923. The new program storage directory 905 is changed to a new current program storage directory 906 by means of processing 922. New current program management information 910 is loaded by means of processing 921. The program management information 914 on the main storage device 902 is updated. Thus processing 1007 is performed. Thereby program replacement is completed. The OS executes the new control program 916.

Figure 11:
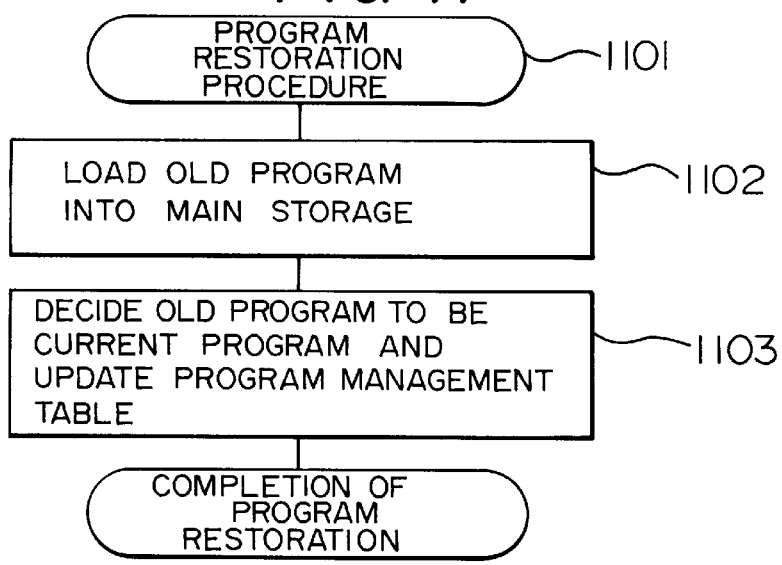
FIG. 11 is a diagram showing program restoration processing according to an embodiment of the present invention.

FIG. 11 shows a program restoration procedure using the configuration of FIG. 9. That is to say, FIG. 11 shows a procedure 1101 for registering the old version program 913 as the current version program 911 and executing the control program 916 on the main storage device 902.

The old version program 913 is loaded into the main storage device 902 by means of processing 920 and decided to be the control program 917. Processing 1102 is thus performed.

Thereafter, the current program storage directory 906 is changed to a new program storage directory 905 which is new by means of processing 924. The old program storage directory 907 is changed to a new current program storage directory 906 by means of processing 925. New current program management information 910 is loaded by means of processing 921. The program management information 914 on the main storage device 902 is updated. Processing 1103 is thus performed. Then the OS executes the new control program 916.

In the embodiment 2, only one old program storage directory is illustrated. However, a plurality of old program storage directories may be used. Restoration of the program at an arbitrary time point is possible. Since all of the new version program 909, the current version program 911, and the old version program 913 are loaded into the main storage device 902 and stored therein, it is not necessary to call each program from the auxiliary storage device every time program replacement is performed. Therefore, the stop time of the function of that program can be reduced.

Embodiment 3:

Embodiment 3 is an example of program replacement of the host computer and the PRC connected thereto via the network medium in which the program of the new version is reflected only for a specific computer.

Figure 12:
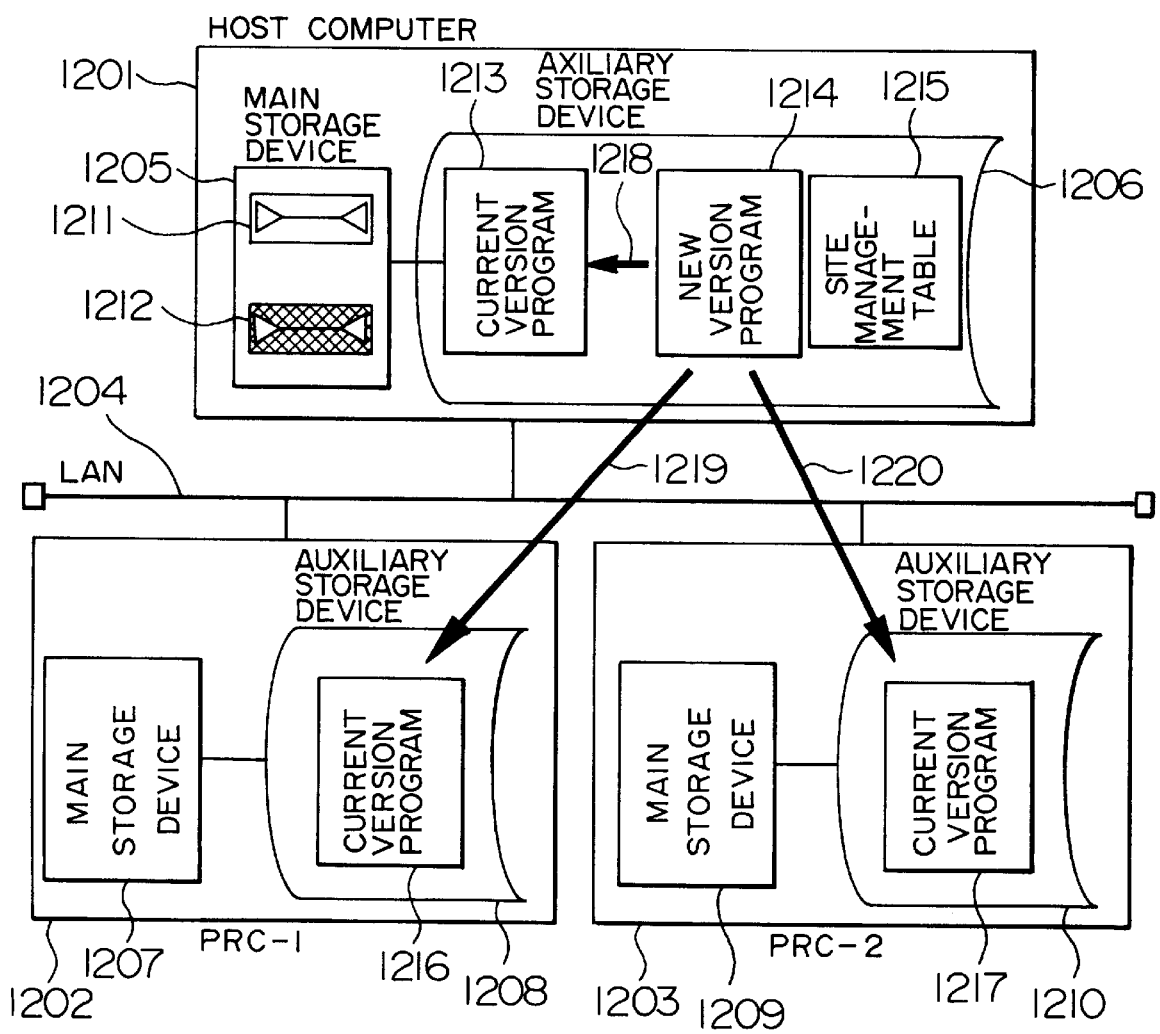
FIG. 12 is a diagram showing the entire configuration according to an embodiment of the present invention.

FIG. 12 is a configuration diagram of the system according to the embodiment 3.

The embodiment 3 is a system in which a host computer 1201 for developing programs is connected to PRC-1 (1202) and PRC-2 (1203) for performing on-line control via LAN 1204 which is a network medium.

The host computer 1201 stores a current version program 1213, a new version program 1214, and a site management table 1215 in its auxiliary storage device 1206. The site management table 1215 is used to manage the current version program 1213 of the host computer 1201, and current version programs 1216 and 1217 respectively of the PRC-1 (1202) and PRC-2 (1203). The main storage device 1205 has loading processing program 1212 for loading the new version program into the host computer 1201, PRC-1 (1202), and PRC-2 (1203), and replacement indication program 1211 for specifying whether the current version program of the host computer 1201, PRC-1 (1202), and PRC-2 (1203) should be replaced with the new version program 1214 or not. Further, the PRC-1 (1202) includes an auxiliary storage device 1208 storing the current version program 1216 and a main storage device 1207. In the same way as the PRC-1 (1202), the PRC-2 (1203) includes an auxiliary storage device 1210 storing the current version program 1217 and a main storage device 1209. The above described current version programs 1213, 1216 and 1217 respectively of the host computer 1201, PRC-1 (1202) and PRC-2 (1203) are identical.

The above described replacement indication program 1211 stores indication as to whether the current version programs 1213, 1216 and 1217 should be replaced with the new version program 1214 in the site management table 1215 while taking a computer as the unit. On the basis of the replacement indication stored in the site management table 1215, the loading processing program 1212 replaces the current version programs 1213, 1216 and 1217 respectively corresponding to the host computer 1201 and on-line computers PRC-1 (1202) and PRC-2 (1203) with the new version program 1214 (as represented by arrows 1218, 1219 and 1220).

Figure 13:
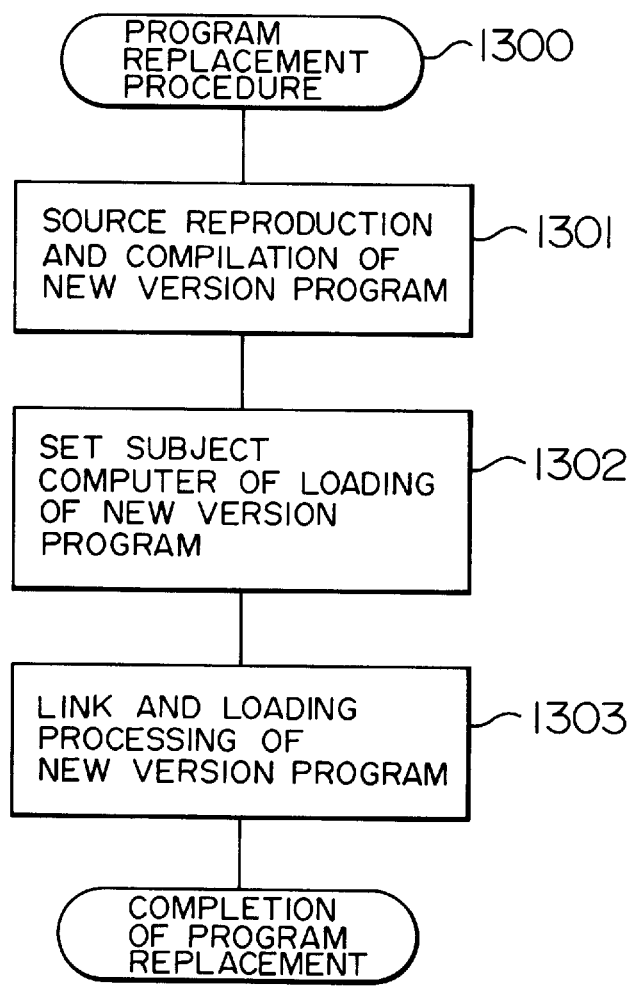
FIG. 13 is a diagram showing a program replacement procedure according to an embodiment of the present invention.

FIG. 13 shows a procedure 1300 for replacing the current version program 1213 of the host computer 2 and the current version programs 1216 and 1217 respectively of the PRC-1 and PRC-2 with the new version program 1214 produced by the host computer 1201 by using the above described configuration.

At first, source production and compilation of the new version program 1214 are performed by the host computer in processing 1301. In processing 1302, the above described replacement indication program 1211 specifying whether replacement should be performed is started to restrict computers in which replacement with the new version program 1214 is made.

Figure 14:
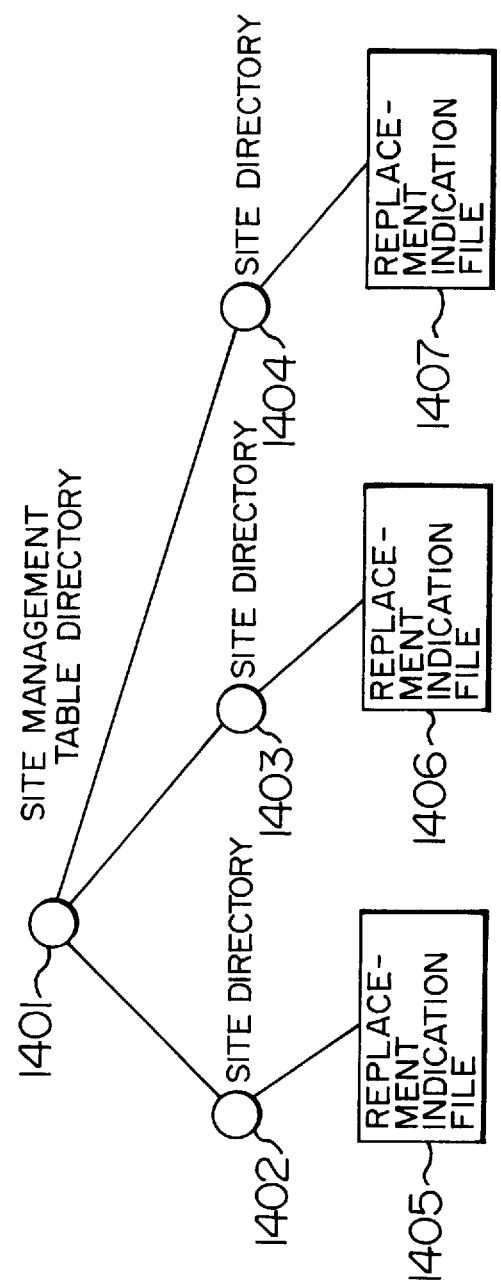
FIG. 14 is a diagram showing the configuration of a site management table according to an embodiment of the present invention.

The replacement indication program 1211 sets replacement/nonreplacement information into a replacement indication file within the site management table 1215 having a configuration as shown in FIG. 14. The site management table 1215 includes a site management table directory 1401, site directories 1402, 1403 and 1404 corresponding to site names which are names of the host computer 1201, PRC-1 (1202) and PRC-2 (1203), and replacement indication files 1405 and 1406 included in respective site directories.

Each of the replacement indication files 1405, 1406 and 1407 has the configuration of a replacement indication file 1500 of a specified site as shown in FIG. 15, and stores replacement/nonreplacement information 1501 and 1502 for specifying whether replacement should be performed or not while taking a program as the unit. The replacement/nonreplacement information 1501 and 1502 includes loading/nonloading flags 1501a and 1502a, and program names 1501b and 1502b, respectively. In case the new version program with which replacement should be performed need not be loaded with the exception of the specified site, the replacement indication program 1211 sets the loading/nonloading flags 1501a and 1502a in the replacement indication file 1500 of the specified site to "LK". In case loading is needed, the loading/nonloading flags 1501a and 1502a are set to "UL".

By storing the replacement/nonreplacement information as described above in replacement indication files 1405, 1406 and 1407 for each site, the computer which is the subject of loading can be specified while taking a program as the unit.

Link and loading processing 1303 of the new version program will now be described. In the link and loading processing 1303, objects obtained by compiling the new version program source in the host computer, and a new version program is produced. Thereafter, the destination computer of loading of the new version program is searched from the replacement indication file within the above described site management table 1215, and the current version program is replaced with the new version program.

Figure 16:
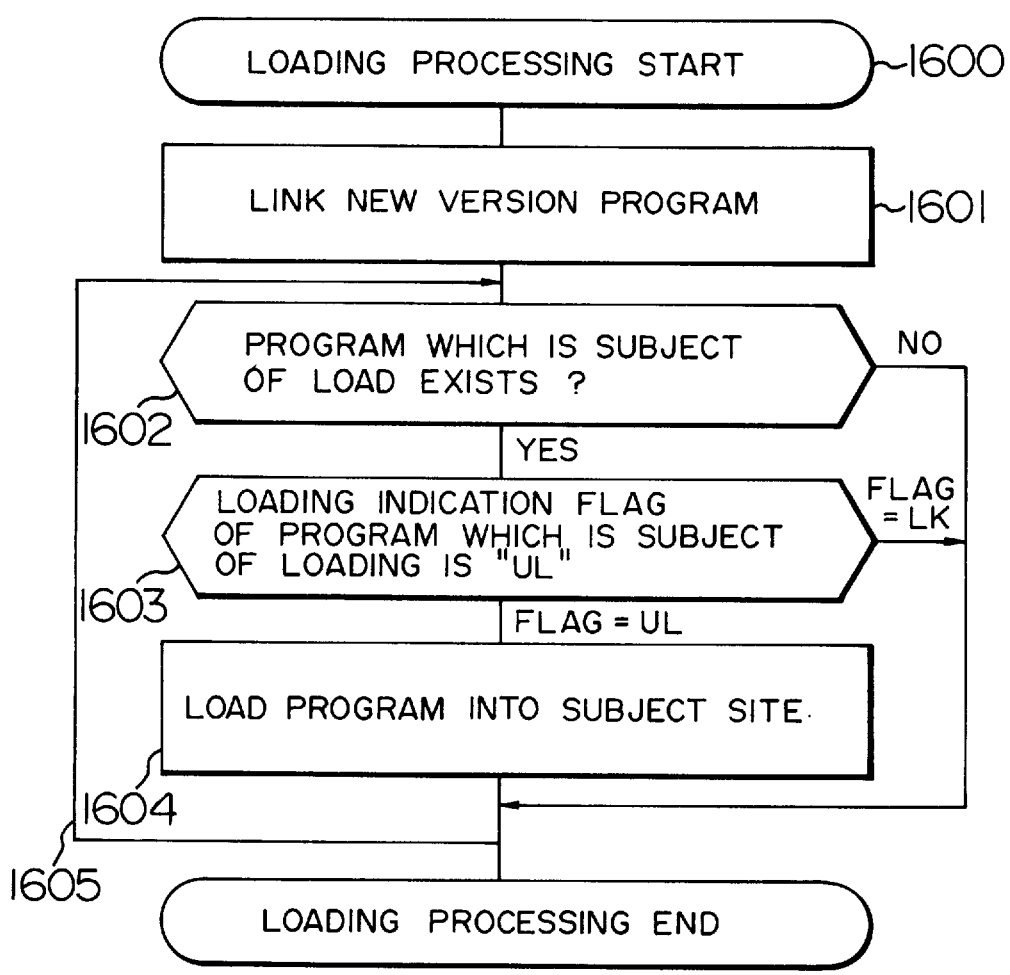
FIG. 16 is a diagram showing loading processing according to an embodiment of the present invention.

The flow of loading processing of the new version program will now be described by referring to FIG. 16.

If the loading processing of the new version program has been started in box 1600, objects compiled by a compiler from the new version program source produced by the host computer 1201 are linked and one new version program 1214 is produced in processing 1601. Then in processing 1602, the computer which is the subject of loading of the new version program 1214 is searched in the replacement indication file 1500, a site which is the subject of loading is determined, and existence of an entry having the same name as that of the new version program in the replacement indication file 1500 is checked. If the name does not exist, the site is decided to be a site which is not the subject of loading, and a search is made in a replacement indication file of another site directory (processing 1605). In case the same name as that of the new version program exists, loading/nonloading flags 1501a and 1502a in the replacement indication file 1500 are checked while taking a program as the unit in processing 1603. If the loading/nonloading flag is "LK" as shown in 1502a, then the loading is made unnecessary and a search is made in the next site without performing loading processing 1604 (processing 1605). If the loading/nonloading flag is "UL" as shown in 1501a, then the site is judged to be a site which is the subject of loading and a new version program is loaded in processing 1604. By repeating this processing as many times as the number of sites, the new version program can be loaded only for specific sites which need replacement.

By providing restricting function (key function) of a loading computer as heretofore described, destination of program loading for the PRC-1 (1202) and PRC-2 (1203) connected to the host computer 1201 via the network can be specified at one time. Therefore, operation mistakes due to mistakes in specification of destination site of loading can be prevented.

Embodiment 4:

Embodiment 4 is an example in which a system having a plurality of computers connected via a network is provided with site number check function for checking site number in order to prevent false loading into a computer which is not the subject of loading when a program is to be loaded into a specific computer.

Figure 17:
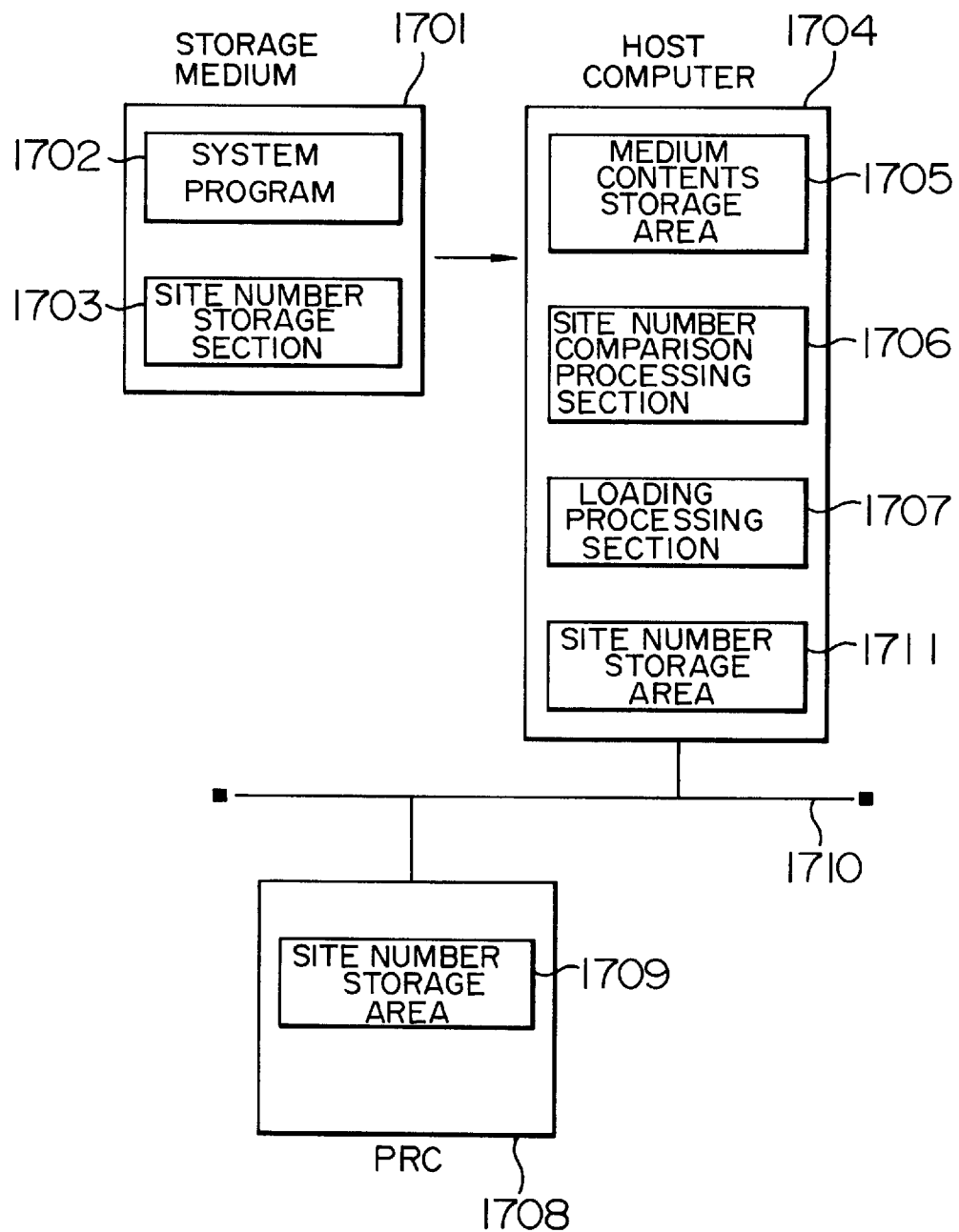
FIG. 17 is a diagram showing the configuration of a site number check function according to an embodiment of the present invention.

FIG. 17 is a configuration diagram of hardware having site number check function according to the embodiment 4. In a system having a host computer 1704 and an on-line computer PRC 1708 connected with each other via a network 1710, the PRC 1708 has a site number storage area 1709 for storing site numbers assigned to respective computers. A system program 1702 to be loaded into the PRC 1708 and a site number storage section 1703 are stored in a storage medium 1701. The host computer 1704 is so configured as to have a loading processing section 1707 for loading contents of the above described storage medium 1701 into the PRC 1708, a site number comparison processing section 1706 for comparing site numbers, a medium contents storage area 1705 for temporarily storing the contents of the storage medium 1701, and a site number storage area 1711 for storing the site number assigned to the host computer 1704. As the storage medium 1701, an external storage device such as magnetic tape or a magnetic disk is used.

FIG. 18 shows loading processing for loading the system program 1702 from the storage medium 1701 into the PRC 1708 via the host computer 1704. First of all, the loading processing section 1707 loads a site number stored in the storage medium 1701 into the medium contents storage area 1705 of the host computer 1704 in processing 1801. Then the loading processing section 1707 calls the site number comparison processing section 1706. And the site number comparison processing 1802 is performed by the site number comparison processing section 1706. The site number comparison processing is shown in FIG. 19 in detail. In the site number comparison processing 1802, the computer which is the subject of loading is first judged in processing 1901.

Figure 20:
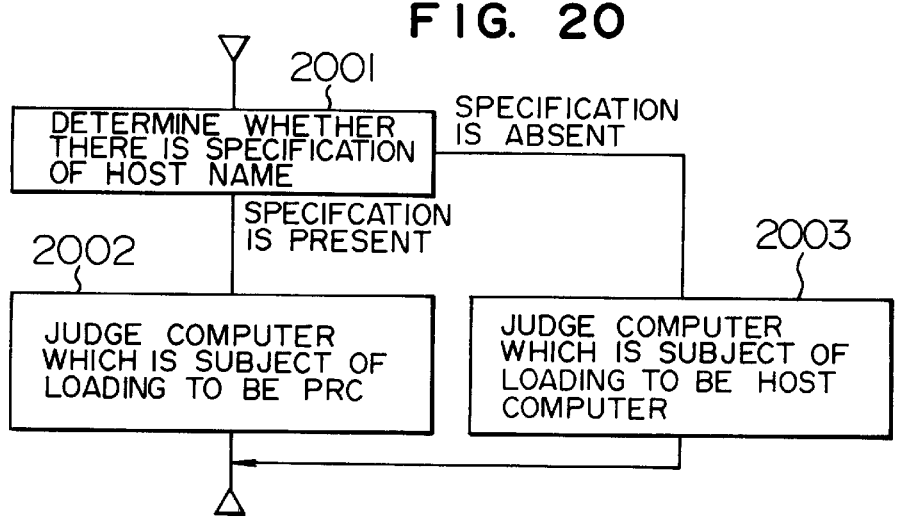
FIG. 20 is a diagram showing decision processing of a computer which is the subject of loading according to an embodiment of the present invention.

Details of this judgment method will now be described. As shown in FIG. 20, it is determined in processing 2001 whether there is specification given by an operator having a host name used as the computer identification name in the network management. If there is specification, the PRC 1708 is judged to be the subject of loading as shown in box 2002. If there is not specification of the host name, the host computer 1704 is judged to be the subject of loading as shown in box 2003. If the PRC 1708 is judged to be the subject of loading as shown in box 2002 as a result of judgment of computer which is the subject of loading formed in processing 1901 of FIG. 19, then the site number is transferred from the site number storage area 1709 of the PRC 1708 specified by the host name to the host computer 1704 in processing 1902 of FIG. 19 and the transferred site number is compared with the site number stored in the medium contents storage area 1705 in processing 1903 of FIG. 19. On the other hand, if the host computer 1704 is judged to be the subject of loading as shown in box 2003 as a result of judgment of computer which is the subject of loading formed in processing 1901, then the site number stored in the site number storage area 1711 of the host computer 1704 is compared with the site number stored in the medium contents storage area 1705 in processing 1904 of FIG. 19.

If the site numbers coincide with each other as a result of comparison of site numbers made in the above described processing 1802, then in processing 1803 the system program 1702 is loaded from the storage medium 1701 into the medium contents storage area 1705 of the host computer 1704, and thereafter the system program 1702 is loaded into the PRC 1708 or the host computer 1704, which is the subject computer of loading.

On the other hand, if the site numbers do not coincide with each other as a result of site number comparison, then in processing 1804 a message indicating that the site numbers do not coincide with each other is outputted and loading processing is finished without loading the system program 1702.

As heretofore described, the program restricted in site (computer) to be used cannot be used outside of the site (computer) to be used. Therefore, license check as to whether the program can be used or not becomes possible.

Embodiment 5:

In the present embodiment, the advance loading function of the system program will now be described.

Figure 21:
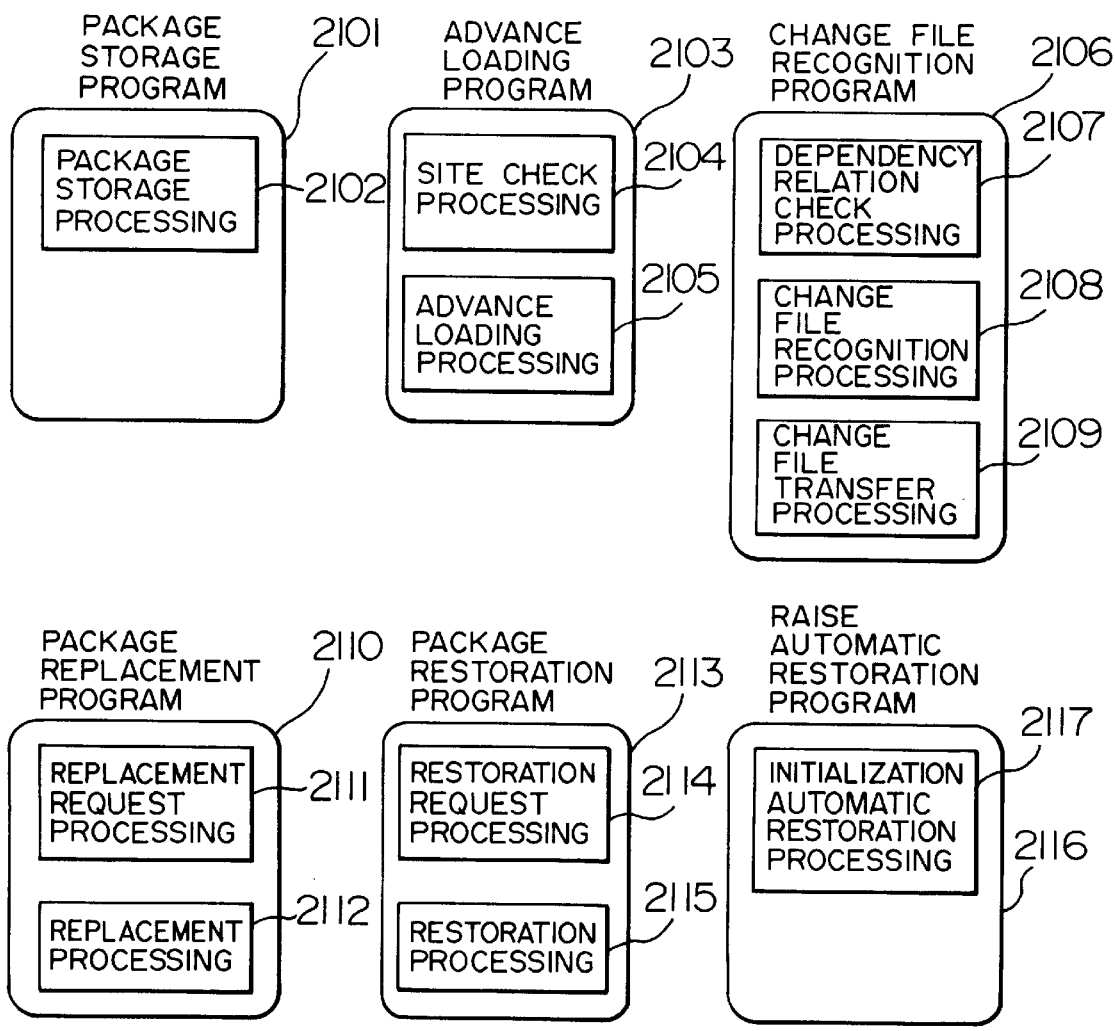
FIG. 21 is a diagram showing the configuration of programs relating to maintenance of the system program according to an embodiment of the present invention.

FIG. 21 shows a program configuration for implementing the loading management of the system program of the PRC.

Typically, system programs are not managed in the form of a single program, but system programs are managed by taking a plurality of files implementing the same kind of function as the unit. Those files are referred to as package.

A package storage program 2101 has package storage processing 2102. Programs are registered as a package and stored in the medium.

While the PRC is operating on-line, the advance loading program 2103 loads the package registered by the package storage program 2101 from the storage medium. The advance loading program 2103 has site check processing 2103 for preventing a package from being falsely loaded into a computer which has not yet provided the package and advance loading processing 2105 for performing loading on-line.

Change file recognition program 2106 compares the package loaded by the advance loading program 2103 with the package now being used on-line (hereafter referred to as package of on-line execution environment) to recognize a change file. The change file recognition program 2106 has dependency relation check processing 2107 for confirming loading of package version required for normal operation of the package, change file recognition processing 2108 for recognizing a change file in the loaded package, and change file transfer processing 2109 for transferring the change file recognized by the change file recognition processing 2108 to the auxiliary storage device of the PRC connected via the network.

A package replacement program 2110 replaces the change file recognized by the change file recognition program 2106 with a file having the same name of the on-line execution environment. The package replacement program 2110 has replacement request processing 2111 for registering a replacement request and replacement processing 2112 for actually performing file replacement.

A package restoration program 2113 returns the file returns the file replaced by the package replacement program 2110 to the on-line execution environment and restores the state preceding the replacement. The package restoration program 2113 has restoration request processing 2114 for registering a restoration request and restoration processing 2115 for actually restoring the file.

Initialization automatic restoration program 2116 replaces the OS with OS newly produced during online operation (hereafter referred to as kernel) when the system is initialized again, and starts the kernel obtained by the replacement. In case system down occurs before the system comes to the operation state, the initialization automatic restoration program 2116 restores the kernel before replacement when the system is to be initialized again, and initialize the system. The initialization automatic restoration program 2116 has initialization automatic restoration processing 2117.

Figure 22:
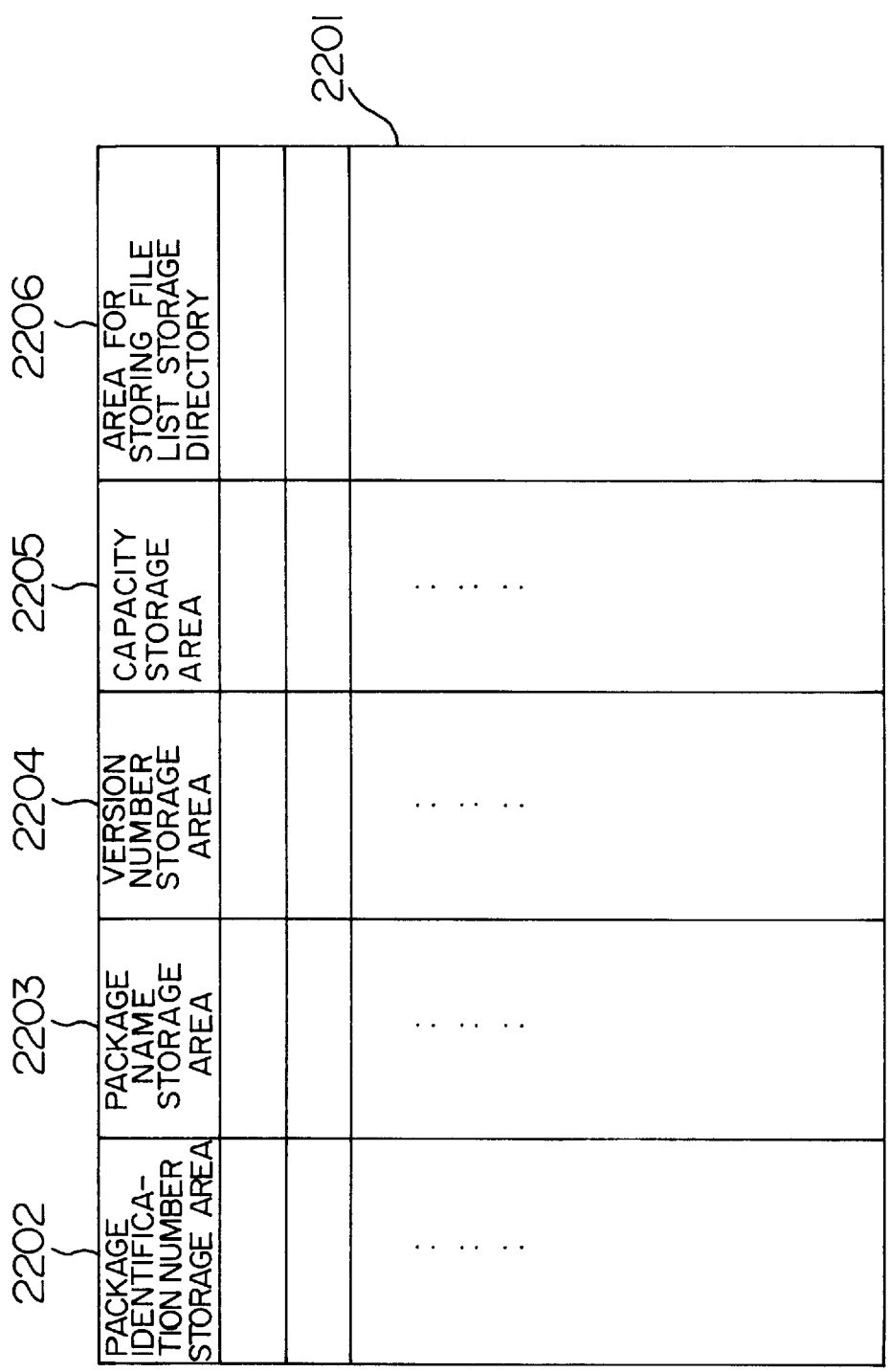
FIG. 22 is a diagram showing the configuration of a package list file according to an embodiment of the present invention.

FIG. 22 shows the format of a package list file 2201 for managing packages stored in the package storage medium. In a package identification number storage area 2202, identification numbers peculiar to respective packages are stored. In a package name storage area 2203, package names are stored. In a version number storage area 2204, version numbers which are time serial management numbers of the package are stored. In a capacity storage area 2205, the total capacity of all files in each package is stored. In a file list storage directory 2206, an area for storing a file management file 2301 is stored.

FIG. 23 shows the format of the file management file 2301 for managing files included in each file. In a dependency package name storage area 2302, names of other packages providing functions to be used for normal operation of the package are stored. In a version number storage area 2303, version numbers capable of using utilization function are stored. In a file name storage area 2304, file names in the package are stored. In a latest modified time storage area 2305, the latest modified time of each file in the file name storage area 2304 is stored.

Figure 24:
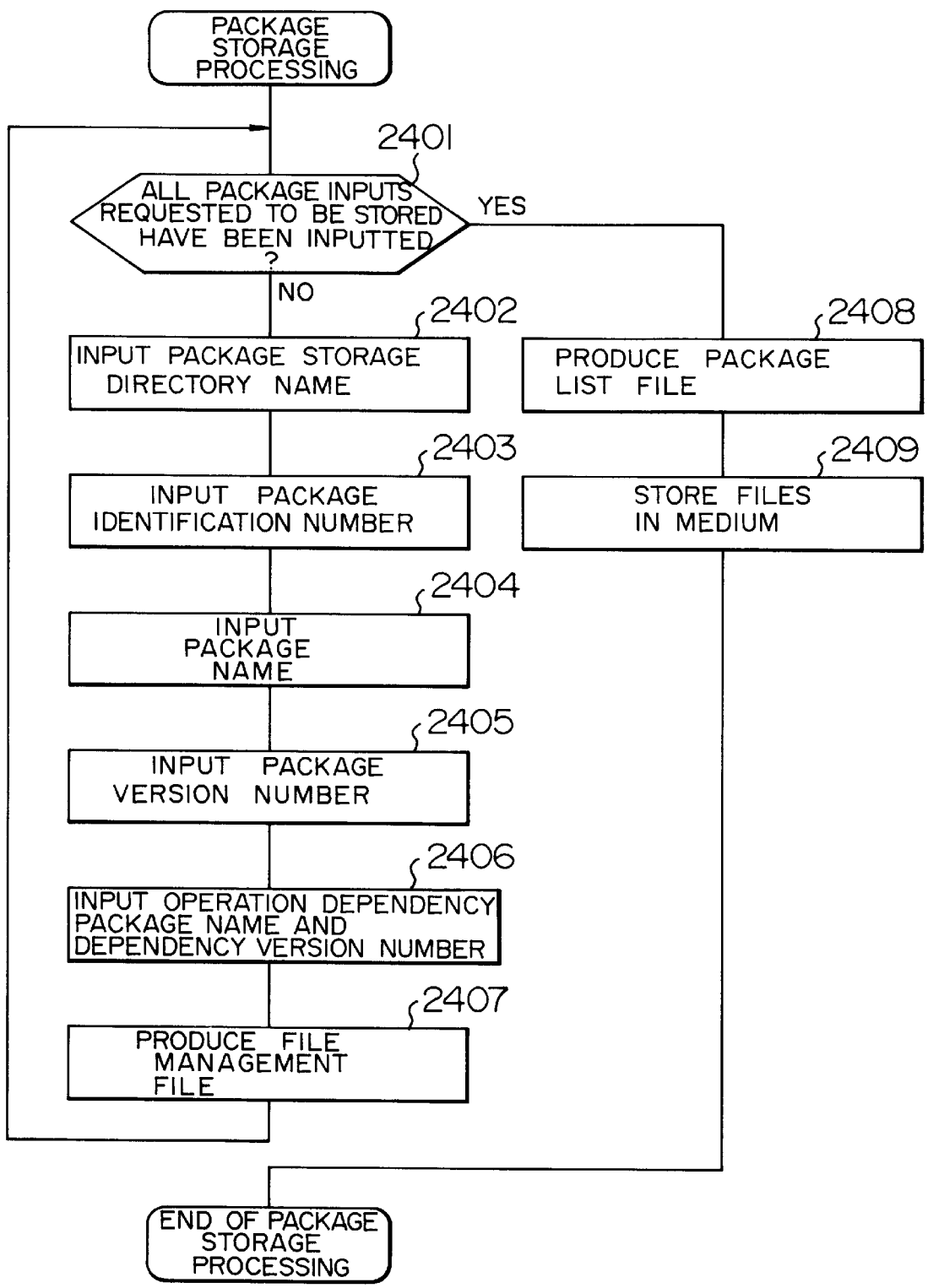
FIG. 24 is a diagram showing package storage processing according to an embodiment of the present invention.

FIG. 24 shows the outline of the package storage processing 2102 of the package storage program 2101 for registering file groups as packages and storing them in the medium. In processing 2402, the package storage processing receives the inputted package storage directory name, i.e., the name of the area in which the file group forming one package exists. Thereafter, the package storage processing receives the inputted package identification number in processing 2403, receives the inputted package name in processing 2404, receives the inputted package version number in processing 2405, and receives in processing 2406 the inputted package name having an operation dependency function and the inputted version number whereto dependency function is provided. Further, in processing 2407, the file group in the package storage directory is recognized and the file management file 2301 is produced. In processing 2406, the dependency package name storage area 2302, the version number storage area 2303, the file name storage area 2302, the version number storage area 2303, the file name storage area 2304, and the latest modification time storage area 2305 are inputted by using the file management function of the computer while taking input and a file as the unit. Processing 2401–2407 is repeated by taking a package as the unit. In processing 2401, it is determined whether every package information requested to be stored has been inputted or not. If inputting has been completed, then in processing 2408 the package list file 2201 is produced and respective information pieces are respectively stored in the package identification number storage area 2202, the package storage area 2203, and the version number storage area 2204 on the basis of inputs. Further, the total capacity of files in the package is calculated and stored in the capacity storage area by using the file management function of the computer. Further, the storage directory of the file management file 2301 produced by the present processing is determined so that the same names may not be used while taking a package as the unit, and it is stored in the file list storage directory area (processing 2408). Finally, the package list file 2201, the file management file 2301, and the files in the package are stored in the medium (processing 2409).

Figure 25:
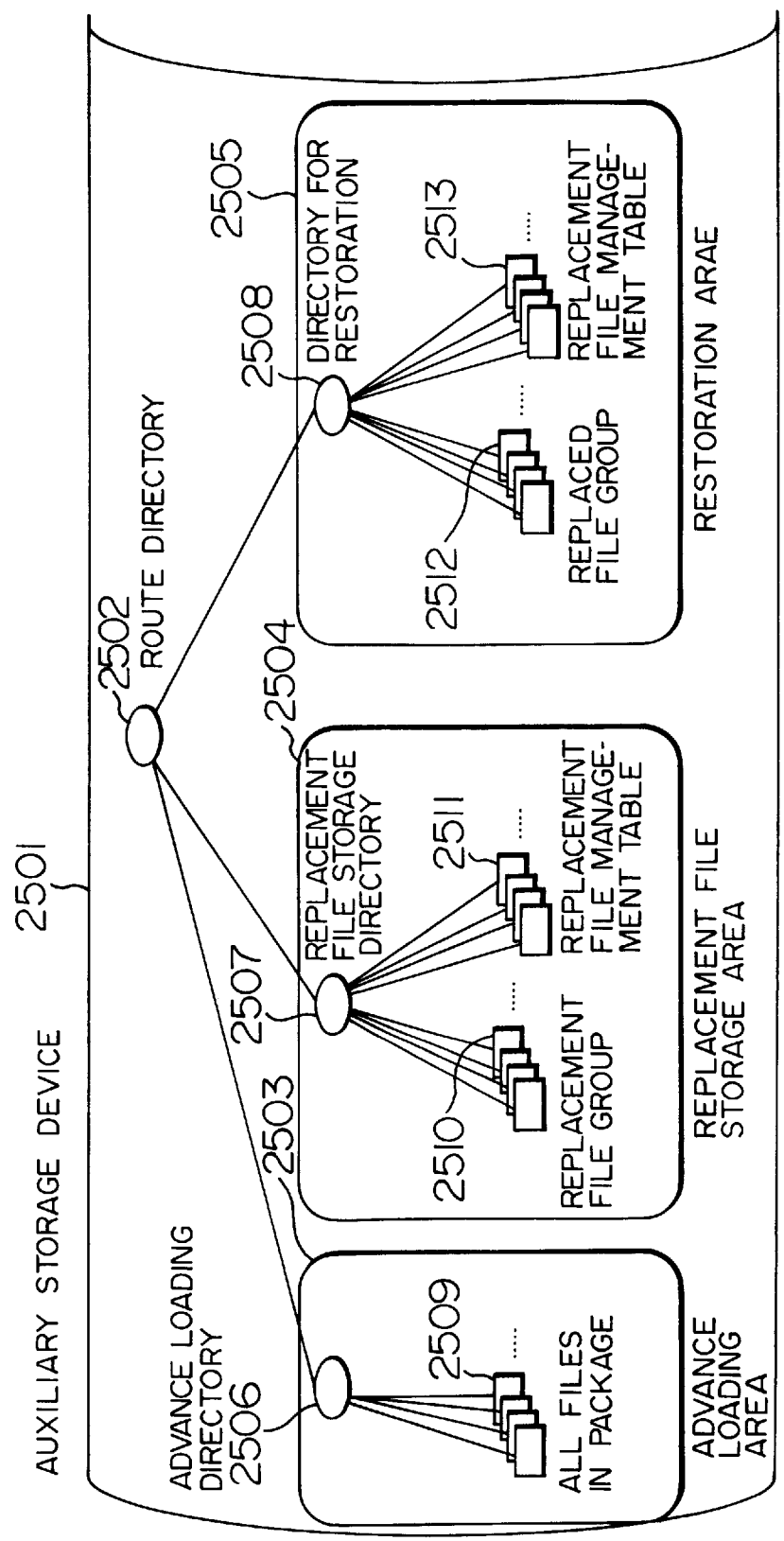
FIG. 25 is a diagram showing an area used for system program maintenance according to an embodiment of the present invention.

FIG. 25 shows the area configuration in the auxiliary storage device 2501 of the PRC.

In the auxiliary storage device 2501, a route directory 2502 representing the top layer of the area which can be used by the computer exists. Below the route directory 2502, an advance loading directory 2506, a replacement file storage directory 2507, and a directory 2508 for restoration exist. An area located under the advance loading directory 2506 is defined as advance loading area 2503. All files 2509 in the package stored in the medium are loaded into the advance loading area 2503. An area located under the replacement file storage directory 2507 is defined as replacement file storage area 2504. Out of all files 2509 in the package, files changed from the on-line execution environment are extracted as replacement file group 2510 and stored in the replacement file storage area 2504. In the replacement file storage area 2507, a replacement file management table 2511 for managing the replacement file group 2510 is stored. An area located under the restoration directory 2508 is defined as restoration area 2505. A replaced file group 2512 which is the replaced file group of on-line execution environment is stored in the restoration area 2505. In the restoration area 2505, a replacement file management table 2513 for managing the replaced file group is also stored.

Figure 26:
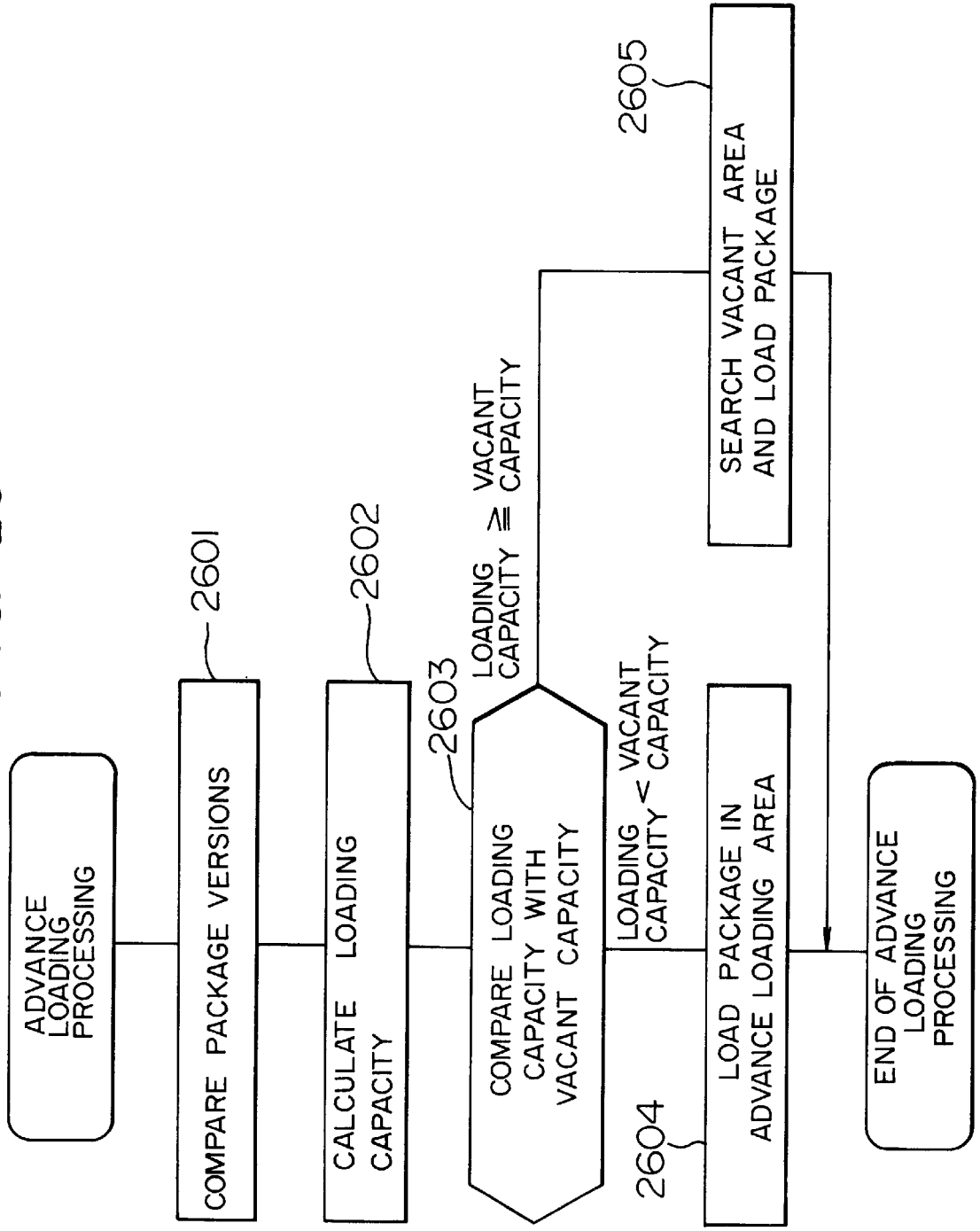
FIG. 26 is a diagram showing advance loading processing of the system program according to an embodiment of the present invention.

FIG. 26 shows the processing flow of the advance loading processing 2105 of the advance loading program 2108. The advance loading processing 2105 is processing for loading the file group included in the package from the package storage medium into the advance loading area 2503.

In processing 2601, the site number check processing 2104 having the site number check function shown in the embodiment 4 compares the package list file 2201 which has already been read into the advance loading area 2503 with the package list file located in the on-line execution environment. As for contents of comparison, packages having the same package identification numbers in the package identification number storage area 2202 are regarded as the same packages. Version numbers of the same package (stored in the version number storage area 2204) are compared. Only packages of different versions are recognized, and these are decided to be packages which are the subject of loading. This processing is performed in order to omit loading processing of the same version of packages already stored.

In processing 2602, the loading capacity of the entire package which is the subject of loading is calculated by referring to the capacity storage area 2205.

Then, in processing 2603, the vacant capacity of the advance loading area 2503 is derived from the file management function of the computer and compared with the loading capacity.

If the loading capacity is smaller than the vacant capacity, the package which is the subject of loading is loaded into the advance loading area 2503 in processing 2604.

If the loading capacity is at least equivalent to the vacant capacity, then a vacant area is searched on the basis of the file management function of the computer and the package which is the subject of loading is loaded in processing 2605.

Since advance loading of the package into the advance loading area 2503 in the auxiliary storage device 2501 of the PRC is performed, the suspension time of original computer processing at the time of replacement of the system program can be shortened.

Embodiment 6:

It is now assumed that such a program that dependency relation exists between programs such as a program functioning by using another program is to be loaded. Embodiment 6 is an embodiment for describing dependency relation check function which prevents loading of a program which cannot operate due to absence of a dependency program.

Figure 27:
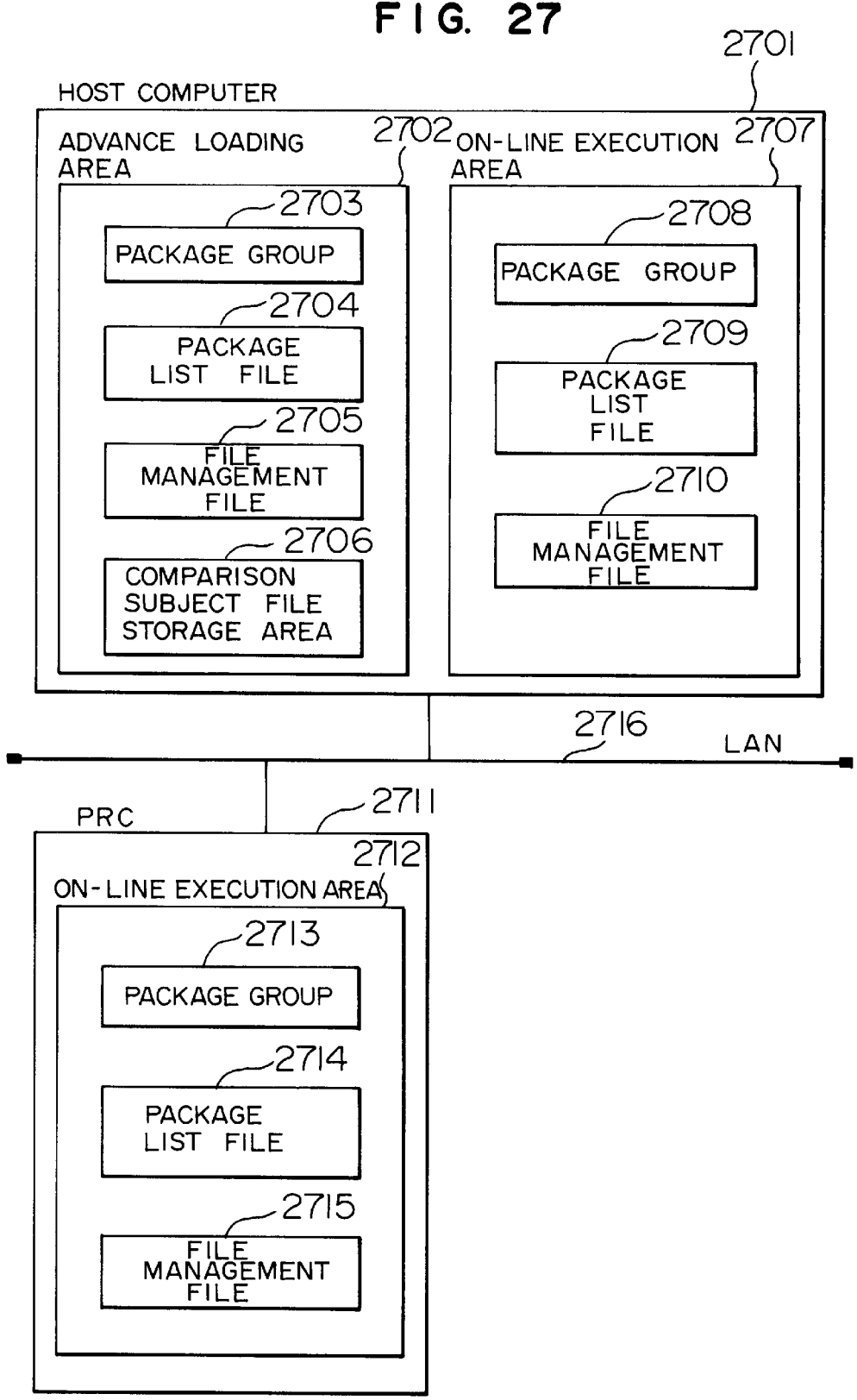
FIG. 27 is a diagram showing the configuration of a function of checking the dependency relation between programs according to an embodiment of the present invention.

FIG. 27 is the configuration diagram of a system having a function of checking the dependency relation between programs according to the embodiment 6. In this configuration, a host computer 2701 which performs advance loading and a PRC 2711 which performs processing of control system are connected via a LAN 2716.

The host computer 2701 has an advance loading area 2702 for storing the advance loading program and an on-line execution area 2707 for storing a program which is now functioning on-line. The advance loading area 2702 has a package group 2703 loaded beforehand, a package list file 2704 for managing the version of the package group, a file management file 2705 for managing the name and version of dependency package, and a comparison subject file storage area 2706 for storing a package list file and a file management file of the PRC. The on-line execution area 2707 has a package group 2708 which can now be executed on-line, a package list file 2709 for managing the version of the package group, and a file management file 2710 for managing the name and version of dependency package.

The PRC 2711 has an on-line execution area 2712. The on-line execution area 2712 has a package group 2713 which can be executed on-line, a package list file 2714 for managing the version of the package group, and a file management file 2715 for managing the name and version of dependency package.

Also in case a plurality of PRCs are used, a similar configuration is used.

Figure 28:
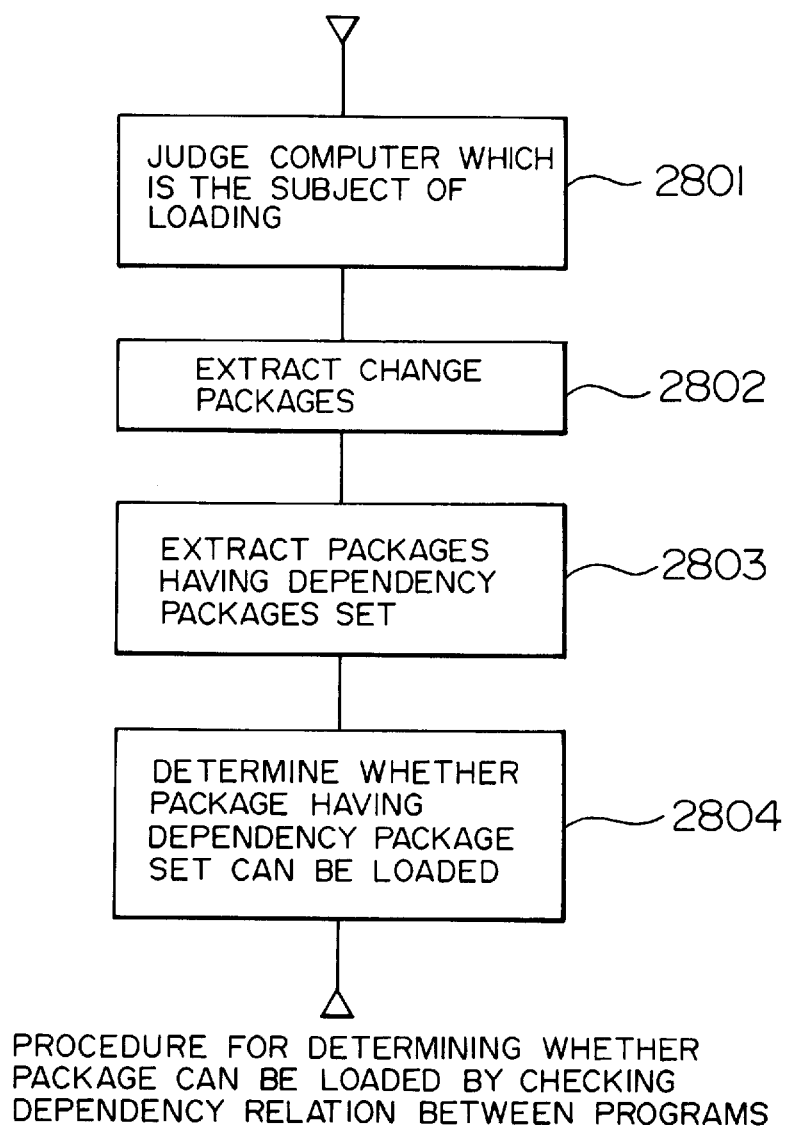
FIG. 28 is a diagram showing a procedure for determining whether a package can be loaded by checking the dependency relation between programs according to an embodiment of the present invention.

FIG. 28 shows a procedure for determining whether package loading can be performed by checking dependency relation between programs in the above described configuration.

Figure 29:
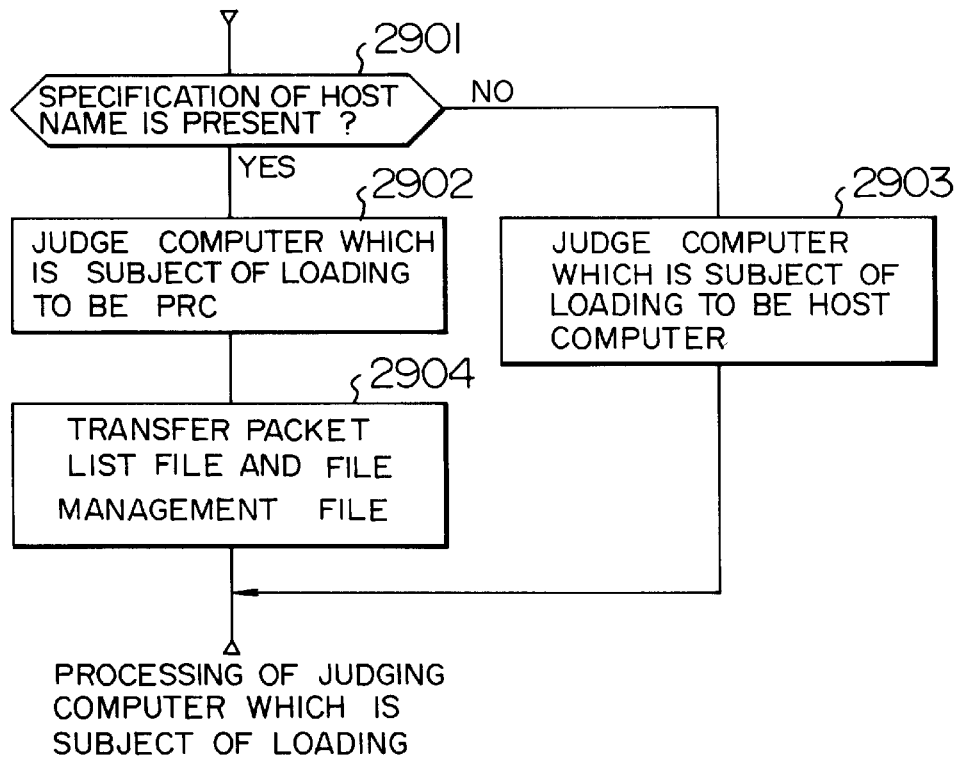
FIG. 29 is a diagram showing processing for judging a computer which is the subject of loading according to an embodiment of the present invention.

First of all, processing 2801 for judging the computer which is the subject of loading is performed. The method for judging the computer which is the subject of loading will now be described by referring to FIG. 29. In processing 2901, it is determined whether the host name specified by the operator is present. If there is specification of host name, then in processing 2902 the PRC 2711 is judged to be the computer which is the subject of loading. If there is no specification of host name, then in processing 2903 the host computer 2701 is judged to be the computer which is the subject of loading. If the PRC 2711 is the computer which is the subject of loading as a result of judgment, then in processing 2904 the package list file 2714 and the file management file 2715 of the PRC are transferred to the host computer 2701 by using file transfer function.

Figure 30:
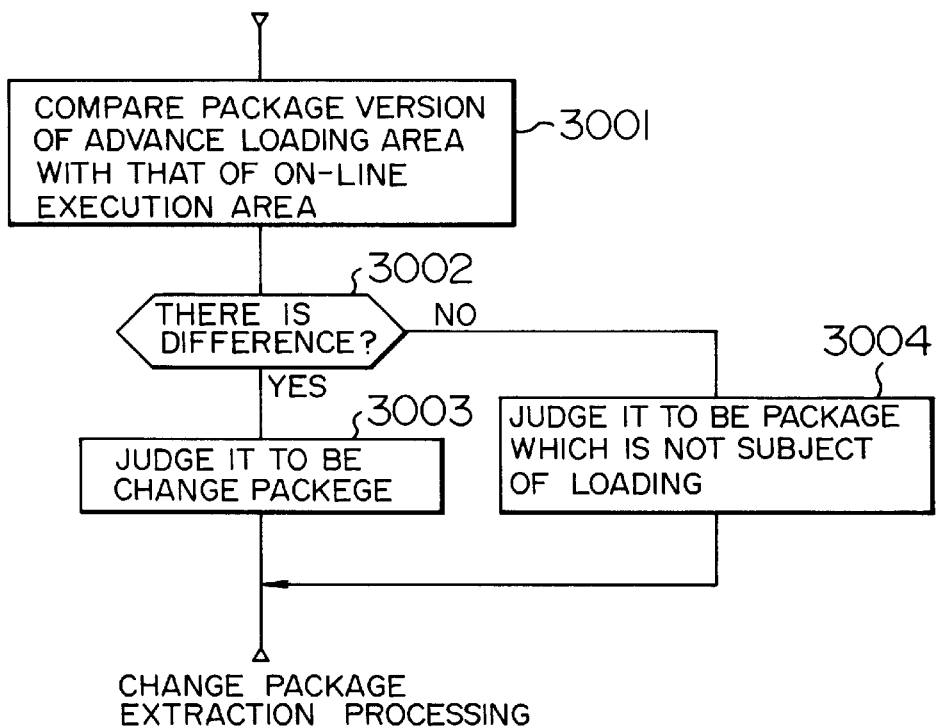
FIG. 30 is a diagram showing change package extraction processing according to an embodiment of the present invention.

Then in processing 2802 of FIG. 28, change packages having different versions are extracted in the advance loading package 2703 and the on-line execution packages 2708 and 2713 respectively of the host computer 2701 and the PRC 2711. Contents of the change package extraction processing 2802 will now be described by referring to FIG. 30. In processing 3001, the package list file 2704 of the advance loading area is compared with the package list files 2709 and 2714 respectively of the on-line execution areas 2707 and 2712 of the PRC. In processing 3002, the result of comparison is decided. In processing 3003, a package having a difference is judged to be a change package. In processing 3004, a package having no difference is judged to be a package which is not the subject of loading.

Then in processing 2803 of FIG. 28, packages included in change packages extracted in the processing 2802 and having dependency packages set are extracted. Judgment as to whether dependency packages have been set is made as follows. If a dependency package name has been set in the dependency package name storage area 2302 of the file management file 2705 corresponding to the change package, the change package is judged to be a package having a dependency package set. If a dependency package name has not been set in the dependency package name storage area 2302, the change package is judged to be a package which is the subject of loading.

Then in processing 2804, it is determined whether the package judged to be a package having a dependency package set can be loaded.

Figure 31:
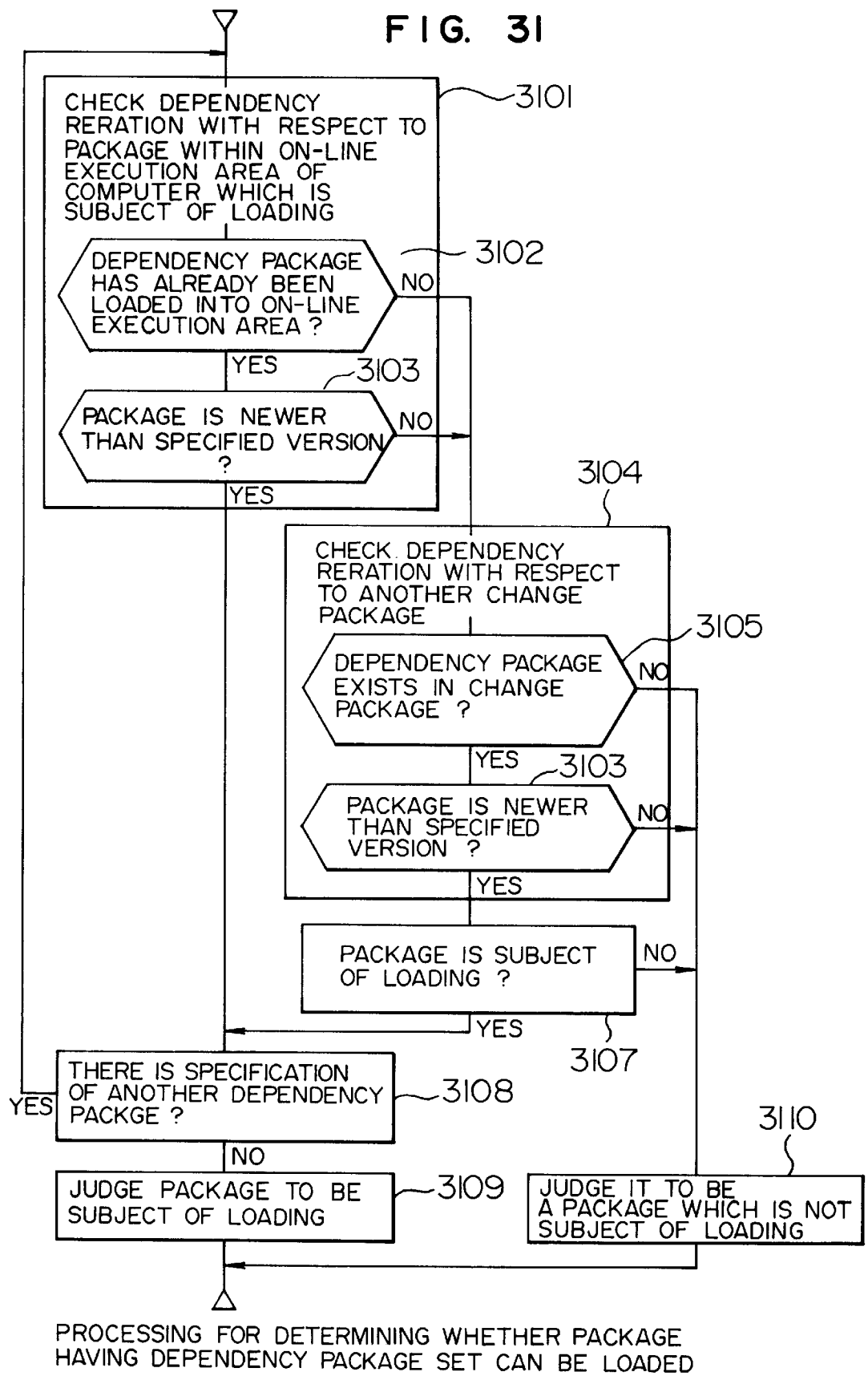
FIG. 31 is a diagram showing processing for determining whether a dependency package and a set package can be loaded according to an embodiment of the present invention.

Contents of the processing 2804 for determining whether the package having a dependency package set can be loaded are shown in FIG. 31. In processing 3101, the package groups 2708 and 2713 of the on-line execution area of the PRC are checked. If this dependency relation is not satisfied, another change package is checked in processing 3104. If the dependency relation is not satisfied in the check processing 3104 for another check package either, the change package is judged to be a package which is not the subject of loading (3110). If the dependency relation is satisfied in the check processing 3104 with respect to another change package, it is determined in processing 3107 whether the dependency package is a package which is the subject of loading. If the dependency package is a package which is not the subject of loading, its change package is also judged to be a package which is not the subject of loading (3110). In case the dependency relation is satisfied in the package check of the on-line execution area of the PRC computer in processing 3101, or in case the dependency relation is not satisfied but the dependency relation is satisfied in the check with respect to another change package and the dependency package is judged to be a package which is not the subject of loading in processing 3104, it is checked in processing 3108 on the basis of the dependency package name storage area 2302 of the file management file 2705 whether another dependency package has been set. If another dependency package has been set, the dependency package is subjected in the same way to processing 2804 for determining whether a package having a dependency package set can be loaded is performed. If another dependency package has not been set, its change package is judged to be a package which is the subject of loading (3109).

Detailed contents of the dependency relation check with respect to the package within the on-line execution area of the PRC made in processing 3101 and the dependency relation check with respect to the change package made in processing 3104 will now be described, respectively.

As for the processing 3101 for checking the dependency relation with respect to the package within the on-line execution area of the PRC, it is first checked in processing 3102 whether a dependency package has been set in the package list files 2709 and 2714 of the on-line execution area of the PRC, i.e., whether a dependency package has already been loaded into the PRC. If a dependency package has not been set, it is determined that the dependency relation is not satisfied. If there is a dependency package already set, then the version of the package is compared with the specified version in processing 3103. As for the comparison method, the version number storage area 2302 of the file management file 2705 of the advance loading area is compared with the version number storage area 2204 of the package list files 2709 and 2714 of the on-line execution area of the PRC. If the version number of the former one is newer, it is determined that the dependency relation is not satisfied. If the version number of the latter one is newer, it is determined that the dependency relation is satisfied.

As for the processing 3104 of checking the dependency relation with respect to the change package, it is first checked in processing 3105 whether a dependency package exists in the change package. If a dependency package does not exist, it is determined that the dependency relation is not satisfied. If a dependency package exists, then the version of that package is compared with the specified version in processing 3106. As for the comparison method, the version number storage area 2302 of the file management file 2705 of the advance loading area corresponding to the dependency package is compared with the version number storage area 2204 of the package list file 2704 in the advance loading area of the host computer. If the version number of the former one is newer, it is determined that the dependency relation is not satisfied. If the version number of the latter one is newer, it is determined that the dependency relation is satisfied.

As described above, it is possible to know the dependency relation as to whether the premised software (program) has been loaded while taking software (program) as the unit. Therefore, it is possible to determine (compensate) whether the software (program) can be executed.

Embodiment 7:

Embodiment 7 is an example of program loading in which only change files are loaded in order to save loading time. To be more concrete, all programs are first loaded into the site (such as a computer) functioning as the host, change files are extracted by examining the dependency relation, and only the change files are stored in the site (computer such as PRC connected to the network) which is the subject of replacement. Herein, change file is a concept including change program and data.

Figure 32:
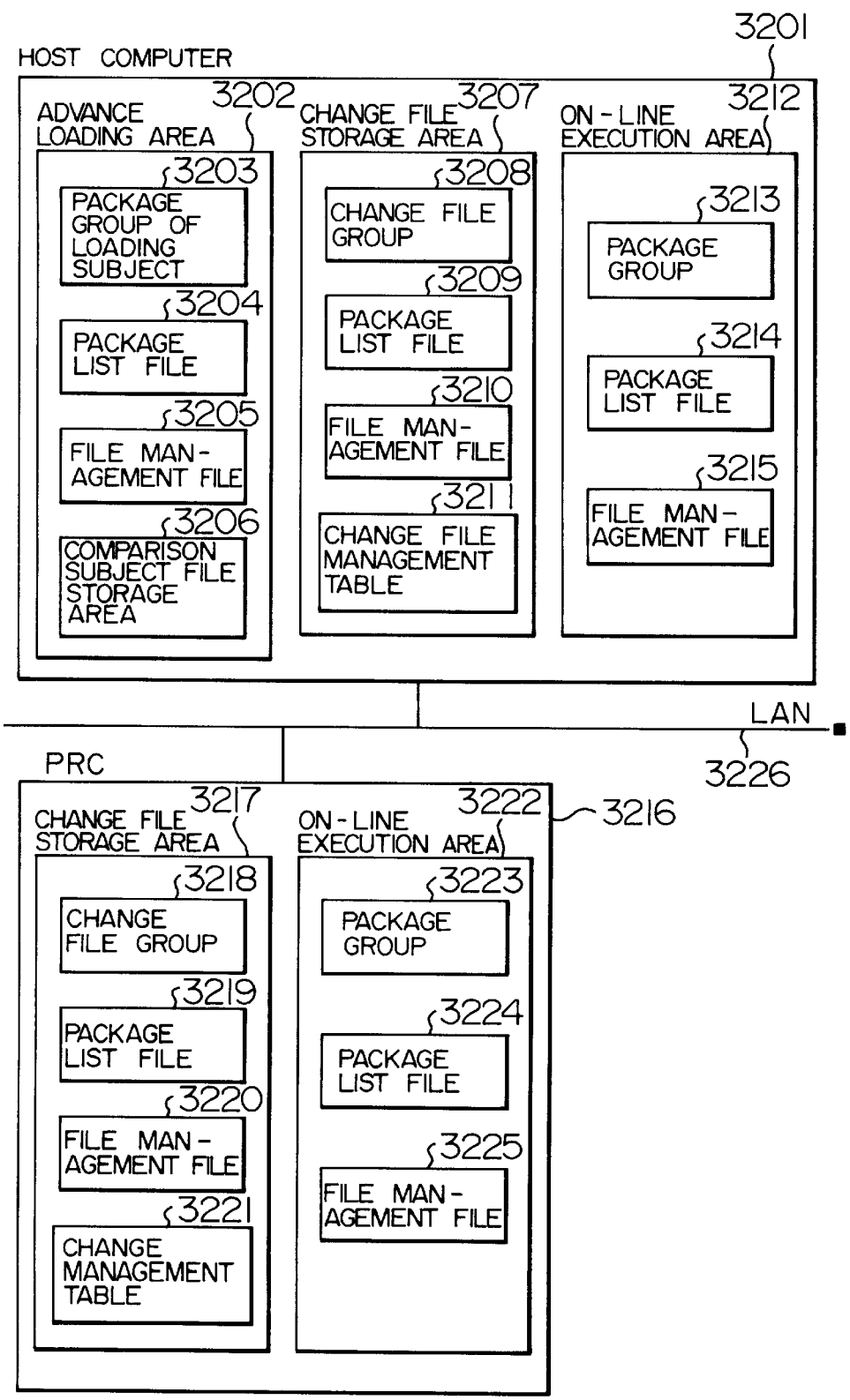
FIG. 32 is a diagram showing the configuration of change file loading function according to an embodiment of the present invention.

FIG. 32 is a system configuration diagram for describing the loading function of change files according to the embodiment 7. In the configuration, a host computer 3201 for performing advance loading and a PRC 3216 for performing processing of the control system are connected via an LAN 3226.

The host computer 3201 has an advance loading area 3202, an on-line execution area 3212, and a change file storage area 3207.

The advance loading area 3202 of the host computer has a package group 3202 of loading subject derived by the dependency relation check function between programs, a package list file 3204 for managing package version, a file management file 3205 for managing versions of files included in each package, and a comparison subject file storage area 3206 for the package list file and the file management file of the PRC. The host computer 3201 has an advance loading area 3202, an on-line execution area 3212, and a change file storage area 3207.

Packages of loading subject stored in the advance loading area 3202 of the host computer are packages loaded by the advance loading function described in the embodiment 5 and include all files forming the package.

The on-line execution area 3212 has a package group 3213 which can now be executed on-line, a package list file 3214 for managing the package version, and a file management file 3215 for managing versions of files forming each package.

The change file storage area 3207 has a change file group 3208 for storing files included in the advance loading area and the on-line execution area and having different versions, a change file management table 3211 for managing names of the change files, a package list file 3209, and a file management file 3210.

The PCS 3216 has an on-line execution area 3222 and a change file storage area 3217. The on-line execution area 3222 has a package group 3223 which can be executed on-line, a package list file 3224 for managing the package version, a file management file 3225 for managing the file names. The change file storage area 3217 has a change file group 3218 for storing files included in the advance loading area 3202 and the on-line execution area 3222 and having different versions, a package list file 3219 for managing the package versions, a file management file 3220 for managing the file names, and a change file management table 3221 for managing names of the change files.

Figure 33:
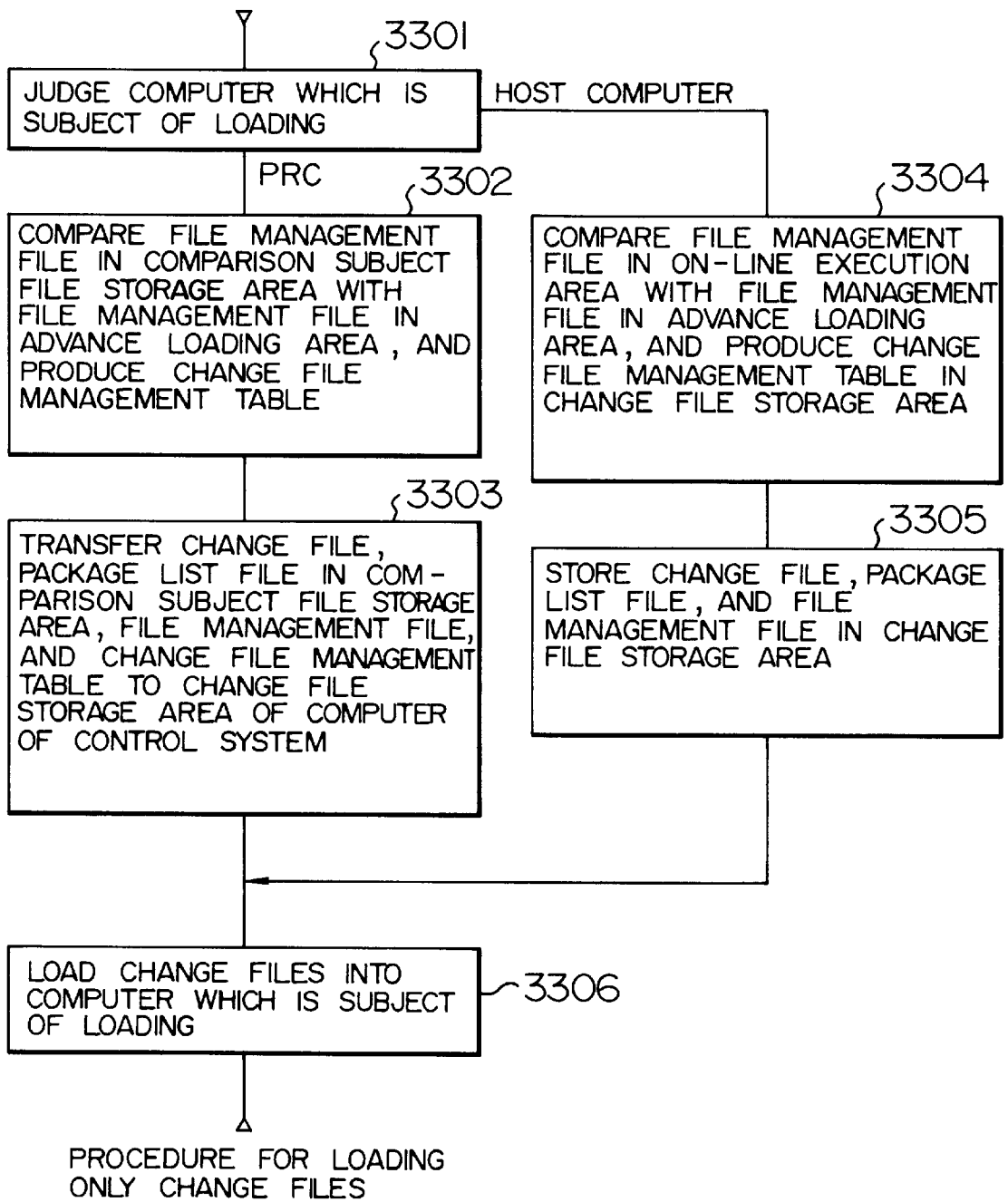
FIG. 33 is a diagram showing processing for loading only a change file according to an embodiment of the present invention.

FIG. 33 shows a procedure for loading a change file by using the configuration of FIG. 32.

First of all, it is determined in processing 3301 whether the computer which is the subject of loading is the host computer 3201 or the PRC 3216.

In case the computer which is the subject of loading is the PRC 3216, then in processing 3302 the file management file in the comparison subject file storage area 3206 transferred at the time of dependency relation check is compared with the file management file 3205. As for this comparison, the latest modified times are compared for the same file names of the file management file 3205 of the same package. In case of noncoincidence, the file is recognized as a change file. Thereby, the name of a change file having a different version is derived, and a change file management table is produced.

Then in processing 3303, a change file stored in the change file management table, a package list file, a file management file whereto the change file belongs, and the produced change file management table are transferred from the advance loading area 3202 of the host computer to the change file storage area 3217 of the PRC by using the file transfer function.

On the other hand, if the computer which is the subject of loading is the host computer 3201, then in processing 3304 the file management file 3209 of the loading subject package in the on-line execution area of the host computer is compared with the file management file 3205 of the loading subject file in the advance loading area. Thereby, the name of a change file having a different version is derived, and the change file management table 3211 is produced in the change file storage area 3207 of the host computer.

Then in processing 3305, the change file stored in the change file management table 3211, the package list file 3204, and the file management file 3205 whereto the change file belongs are transferred from the advance loading area 3202 and stored in the change file storage area 3207.

In processing 3306, change files 3208 and 3218 respectively stored in the change file storage areas 3207 and 3217 of the computer which is the subject of loading are respectively loaded into the on-line execution areas 3212 and 3222 at the time of replacement request on the basis of file names respectively stored in the change file management tables 3211 and 3221. Thereafter, the package list files 3209 and 3219, and the file management files 3210 and 3220 whereto the change files belong are loaded into the on-line execution areas 3212 and 3222, respectively.

In program loading, only change files are loaded as heretofore described. Therefore, the loading time can be saved.

Embodiment 8:

Embodiment 8 is an example in which the function of restoring the state preceding the system program replacement is described.

Figure 34:
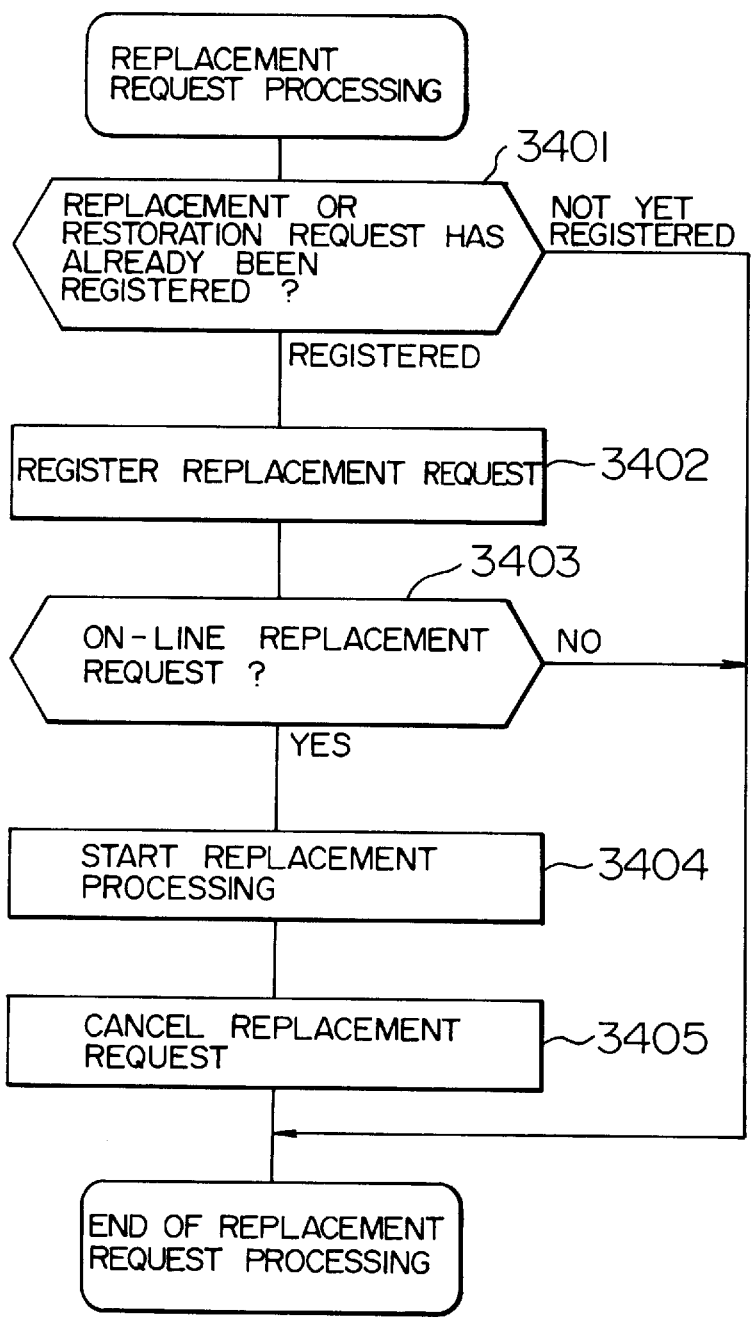
FIG. 34 is a diagram showing system program replacement request processing according to an embodiment of the present invention.

FIG. 34 shows the processing flow of the replacement request processing 2111 of the package replacement program 2110 shown in FIG. 21.

The replacement request processing 2111 is processing of replacing the same name file of the online execution environment with the change file in the package stored in the replacement file storage area by the change file recognition program 2106 having the program dependency relation check function described with reference to the embodiments 6 and 7 and function of loading only the change file within the package. As the replacement method, an on-line replacement method of performing replacement while the computer is in on-line operation or a method of arbitrarily stopping the operation of the computer, performing termination and performing replacement at the time of re-operation and initialization may be selected.

In processing 3401, it is checked whether a replacement or restoration request has already been registered in order to prevent simultaneous execution of replacement and restoration. If registration has already been performed, replacement request processing is finished in processing 3402. If registration has not yet been registered, the replacement request is registered. Then in processing 3403, it is determined whether the request to the package replacement program 2110 is on-line replacement or not. In case of on-line replacement request, replacement processing 2112 is started in processing 3404. After the replacement processing 2112 has been finished, the replacement request is canceled in processing 3405. If the request is not the on-line replacement request, the processing is finished. If the request is not the on-line replacement request, a replacement request is judged in termination processing of the computer started when the computer is arbitrarily stopped. If there is a request, the replacement processing is started. After the processing has been finished, the replacement request registration is canceled.

FIG. 35 shows the processing flow of the replacement processing 2112 of the package replacement program 2110 shown in FIG. 21.

The replacement processing 2112 is processing for replacing the same name file of the on-line execution environment with a change file within a package in the replacement file storage area. Further, the replaced file of the on-line execution environment is transferred to the restoration area 2505.

In processing 3501, it is determined whether a replacement request has been registered. If registration has not been performed yet, the processing is finished. If a request has been registered, it is confirmed in processing 3502 that replacement of files of all packages has been finished. If replacement has been finished, processing is finished. If replacement has not been finished, the replacement file in the package is recognized on the basis of the replacement file management table in processing 3503. In processing 3504, the same name file in the on-line execution environment is replaced with a file in the replacement file storage area 2504. Further, the replaced file is transferred to the restoration area 2505. Further, in processing 3505, the replacement file management table 2511 in the replacement file storage area 2504 is transferred to the restoration area 2505.

Figure 36:
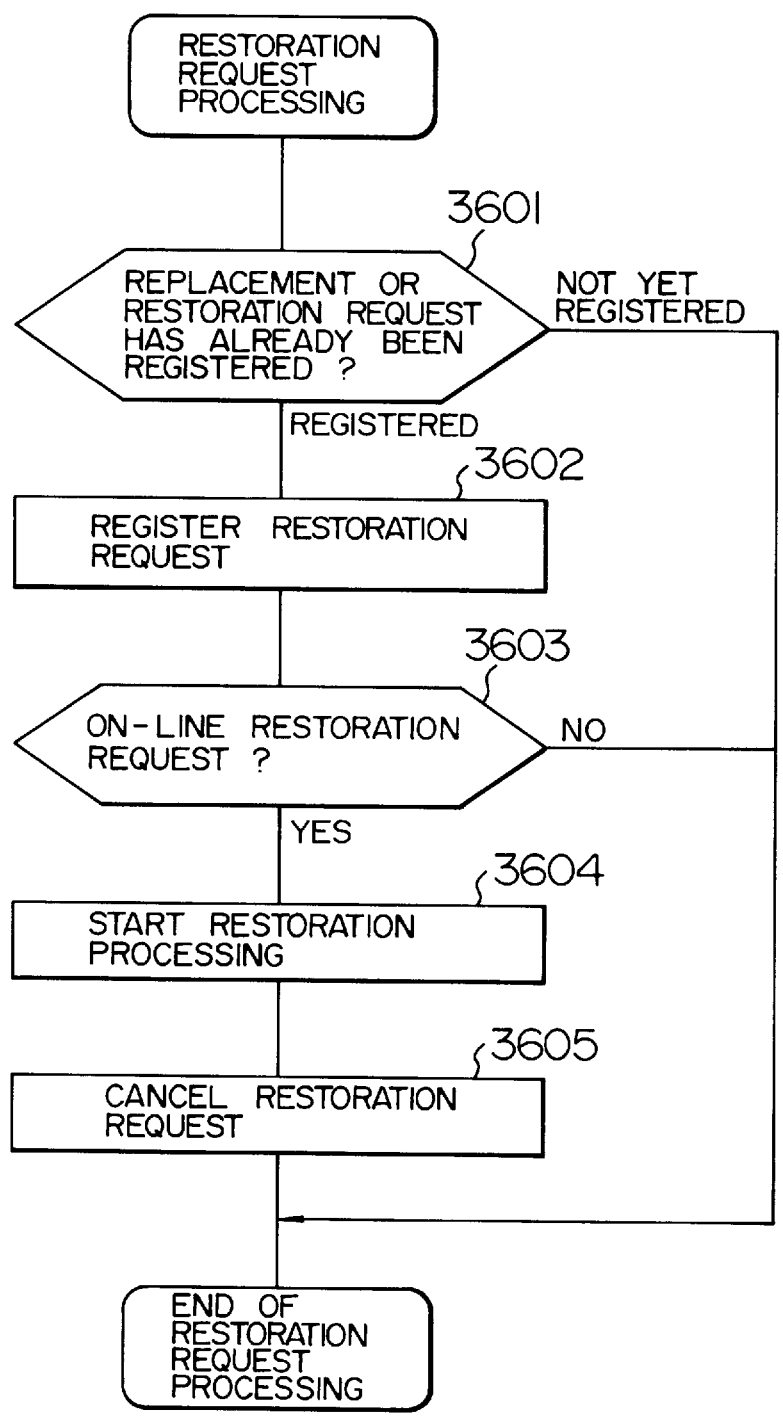
FIG. 36 is a system program restoration request processing according to an embodiment of the present invention.

FIG. 36 shows the processing flow of the restoration request processing 2114 of the package restoration program 2113 illustrated in FIG. 21.

The restoration request processing 2114 is processing for replacing the same name file of on-line execution environment with the replaced file within the package in the restoration area 2505. As for the restoration method, an on-line restoration method for performing restoration while the computer is in on-line operation or a method of arbitrarily stopping the operation of the computer, performing termination and performing restoration at the time of re-operation and initialization may be selected.

In processing 3601, it is checked whether a replacement or restoration request has already been registered in order to prevent simultaneous execution of replacement and restoration. If registration has already been performed, restoration request processing is finished. If registration has not yet been registered, the restoration request is registered in processing 3602. Then in processing 3603, it is determined whether the request to the package restoration program 2113 is on-line restoration or not. Restoration processing 2115 is started in processing 3404. After the restoration processing 2115 has been finished, the restoration request is canceled in processing 3605. If the request is not the on-line restoration request, the processing is finished. If the request is not the on-line restoration request, a restoration request is judged in termination processing of the computer started when the computer is arbitrarily stopped. If there is a request, restoration processing shown in FIG. 37 and described below is started. After the processing has been finished, the replacement request is canceled.

Figure 37:
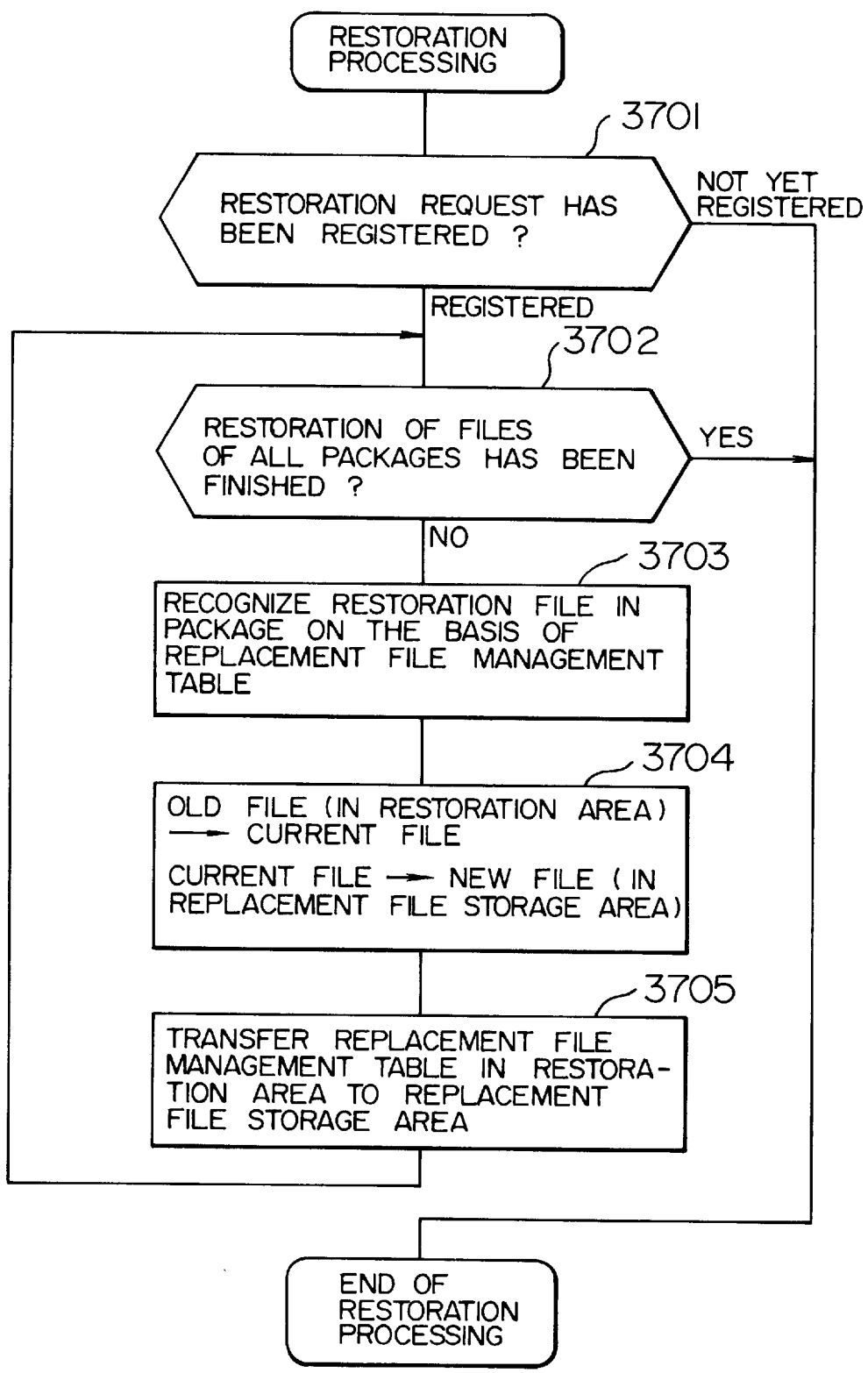
FIG. 37 is a diagram showing system program restoration processing according to an embodiment of the present invention.

FIG. 37 shows the processing flow of the restoration processing 2115 of the package restoration program 2113 shown in FIG. 21.

The restoration processing 2115 is processing for replacing the same name file of the on-line execution environment with the replaced file within the package in the restoration area 2505 to restore the replaced file and transferring the replaced file of the on-line execution environment to the replacement file storage area 2504.

In processing 3701, it is determined whether a restoration request has been registered. If registration has not been performed yet, the processing is finished. If a request has been registered, it is determined in processing 3702 whether restoration of files of all packages has been finished. If it is determined that restoration has not been finished, the restoration file in the package is recognized on the basis of the replacement file management table in processing 3703. In processing 3704, the same name file in the on-line execution environment is replaced with the file in the restoration area 2505 to restore the file. Further, the replaced file is transferred to the replacement file storage area 2504. Further, in processing 3705, the replacement file management table 2511 in the restoration area 2504 is transferred to the replacement file storage area 2504. By this processing, restoration of the state before the replacement becomes possible.

Figure 38:
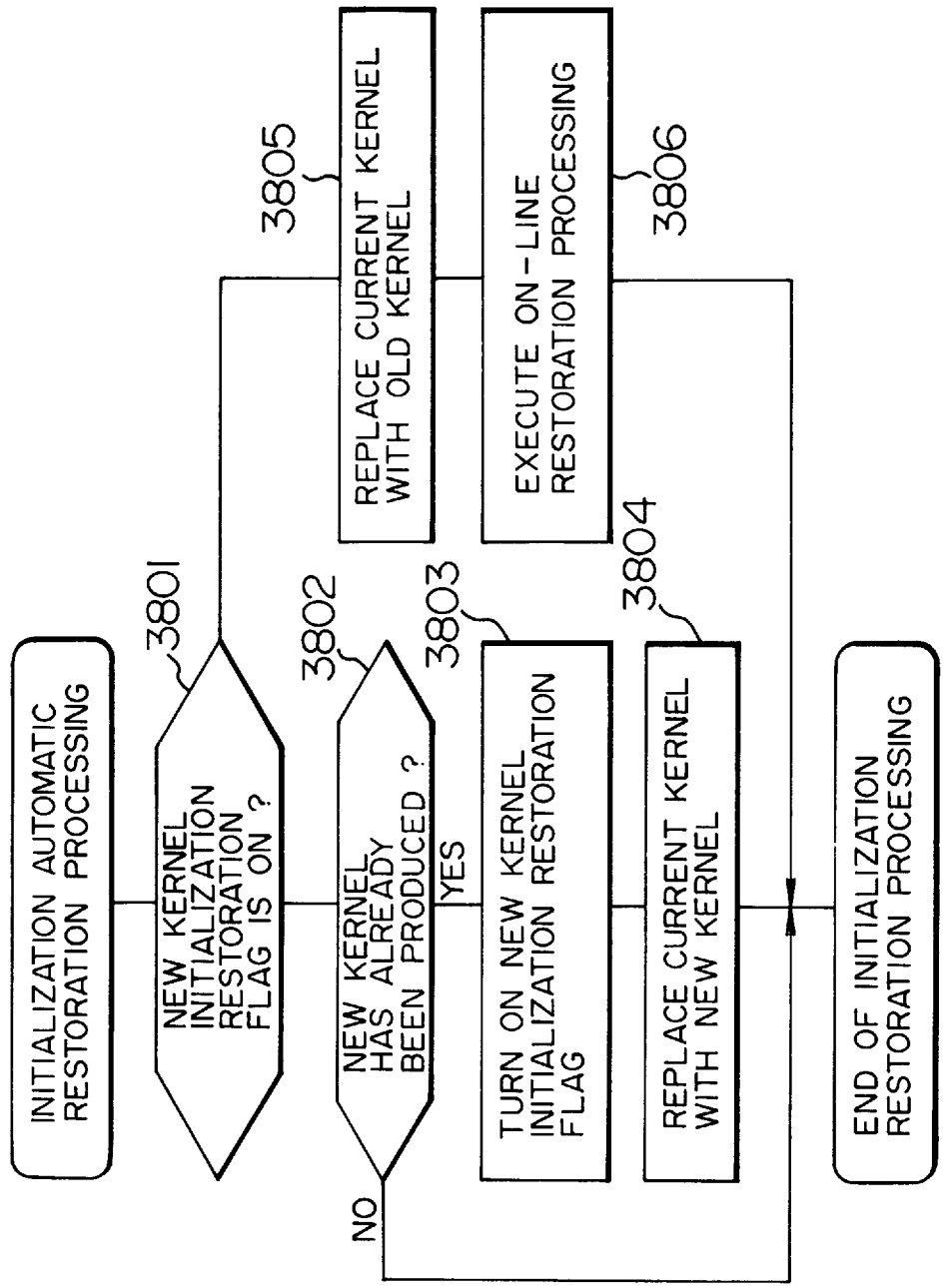
FIG. 38 is a diagram showing system program initialization automatic restoration processing according to an embodiment of the present invention.

FIG. 38 shows the initialization automatic restoration processing 2117 of the initialization automatic restoration program 2116 illustrated in FIG. 21. In case a kernel which is OS is produced while the system is in on-line operation, the initialization automatic restoration processing 2117 replaces the old kernel with the new kernel. In case the system is initialized with the new kernel and system down has occurred before completion of the initialization processing, the initialization automatic restoration processing 2117 performs initialization with the old kernel and performs restoration processing of the package. The initialization automatic restoration processing 2117 is started from the initialization program of the computer.

In processing 3801, it is determined whether a new kernel initialization restoration flag is on. If the flag is off, it is determined in processing 3802 whether a new kernel has already been produced. Whether a kernel is new or old is determined by the name of the kernel. If a new kernel has already been produced, the new kernel initialization restoration flag is turned on in processing 3803. In processing 3804, the current kernel which has heretofore been used is replaced with the new kernel, and the current kernel is handled as the old kernel. When initialization processing of the initialization program has been finished, the new kernel initialization restoration flag is turned off. If system down has occurred before the new kernel initialization restoration flag is turned off, therefore, the initialization automatic restoration program is started again at the time of re-initialization. Since the new kernel initialization restoration flag is off, the current kernel is replaced with the old kernel. In processing 3806, on-line restoration program is started and on-line restoration processing is executed to return the file in the package replaced at the time of termination processing of the computer to the on-line execution environment.

When system down has occurred at the time of replacement with the new kernel, the state before the replacement is thus automatically restored by reinitialization. As a result, reduction of system down time and higher speed of restoration can be attained at the time of replacement with a new kernel.

In the embodiments heretofore described, the computer system performs two kinds of processing, i.e., processing of information system and processing of control system. However, the technical thought of the present invention can also be applied to a computer system performing three or more kinds of processing.

As an example, it is assumed in divisional management of software of the embodiment 1 that processing of the information system is divided into processing of on-line information system and processing of off-line information system so that processing is divided into three parts. Software management in this case will now be described. Herein, processing of online information system is defined as information inquiry and display processing performed in response to it, whereas processing of off-line information system is defined as batch processing performed in the nighttime during which the computer load is reduced. The processing software of the off-line information system is not used except in the nighttime, and its maintenance in times other than the nighttime is possible.

Therefore, there is used a method whereby time allowed for maintenance is set while taking processing as the unit and the maintenance time is managed by the host computer. For managing software of processing of both information systems, the bulletin board method, broad cast method or down load method is used. However, time allowed for replacement of each processing software can be set in time during which each processing software is not used, and the host computer inhibits replacement in time other than the set time. Thereby, reliability of maintenance of software of the information system can be improved. As for the software of processing of the control system, the method described by referring to the embodiments 2 to 8 can be used.

Therefore, the present invention can also be applied to the case where software is divided into three or more parts for divisional management. Thereby, reliability of software maintenance can be improved.

The embodiments have heretofore been described by taking the system program as an example. However, the present invention can also be applied to the user program in the same way.

The foregoing description is summarized as follows.

1) Software which is the subject of maintenance (management) is divided into a plurality of groups. Different maintenance methods are adopted for respective groups. Thereby, software maintenance having expandability and flexibility is possible.

2) Maintenance is performed by dividing software into two groups, i.e., software of processing of the control system and software of processing of the information system. Thereby, high reliability is maintained and the maintenance cost can be reduced.

3) The transmission path is divided between the control system and the information system. For the purpose of software maintenance, the transmission path of the information system is used. Thereby, disturbance to the control system caused by software maintenance can be avoided.

In claim 4, at least one computer is provided for exclusive use of software maintenance. Thereby, centralized management of software of the entire system becomes possible, resulting in improved maintenance efficiency.

4) Prior to changeover to a new software, the new software is stored beforehand. Thereby, software changeover time at the time of occurrence of a changeover request can be shortened.

5) Only programs in which changes have occurred are stored beforehand. Thereby, the area used for prior storage can be reduced.

6) At the time of changeover to a new software, the old used software is stored so as to be restored. Thereby, the state before the changeover can be restored when a trouble has occurred in the software changed over. Temporary restoration of the system becomes possible.

7) At the time of loading, it is determined whether a specified loading program can be loaded into a specified destination computer of loading. Thereby, false loading caused by an error in specification of loading computer can be prevented.

8) When a program is loaded from the medium, the identification number is verified. Thereby, false loading caused by an error in computer can be prevented.

9) At the time of loading, it is confirmed that the program required for operation of the program which is the subject of loading can be used. Thereby, false operation due to inadequacy of program operation environment can be prevented.

Embodiments of the present invention have heretofore been described. The present invention is not limited to the above described contents, but modification is possible within the range of its technical thought.

The present invention is capable of providing a network system having reliability, expandability and flexibility and its software management method.

What is claimed is:

1. A network system comprising:

a plurality of networks;

a plurality of processing devices connected to said networks, wherein at least one of said processing devices is set as a management processing device and the remaining processing devices are divided into a plurality of groups based on processing properties of said processing devices, said groups including at least a processing device group for performing processing of an information system and a processing device group for performing processing of a control system, said group which performs the processing of the control system comprises processing for rewriting a data base corresponding to a controlled system or processing for directly accessing a controlled system, and wherein said group which performs the processing of an information system comprises processing other than rewriting the data base corresponding to the controlled system or directly accessing the controlled system; and software maintenance means stored in said management processing device for maintenance of software which runs on said processing devices, said software maintenance means including a database storing, for each of the processing devices, information identifying the group to which said device belongs and the manner in which the software for said device is to be updated by said software maintenance means;

wherein one of said networks is a maintenance network for distributing a program to a processing device of one of said groups identified in said database to be managed under control of said software maintenance means, said maintenance carried out only on said maintenance network while allowing data transmission between said processing devices on at least a network different from said maintenance network.

2. A network s stem according to claim 1, wherein said processing device groups comprise software management means for performing a bulletin board method, a broadcast method, or a download method to the information system using said maintenance network.

3. A method of software management in a network system including a plurality of networks, a plurality of processing devices connected via said networks and divided into a plurality of processing device groups based on processing properties of said processing devices, software management means for managing different kinds of software being run on said processing devices and software maintenance means for maintenance of software which runs on said processing devices, said method comprising the steps of:

dividing said plurality of processing devices into a plurality of network groups on the basis of processing properties;

selecting as a maintenance network one of said networks to which a plurality of processing devices are connected, including a management processing device;

storing, in said management processing device, identification information of processing devices to be managed, said identification information including the groups to which said devices belong, the manner in which the software for said devices is to be updated, the soft ware running on said processing devices to be managed, and software maintenance means for maintaining said software; and distributing a program via said maintenance network whereby maintenance of said software is carried out under control of said software maintenance means while allowing data transmission between said processing devices on at least a network different from said maintenance network.

4. A software management method according to claim 3, further comprising the steps of:

designating at least one processing device out of said plurality of processing devices as a management processing device;

managing, by said management processing device, said software being run on said processing devices by designating a portion of said software being run on said processing devices as control system software and another portion of said software being run on said processing devices as information system software which is software other than said control system software, and causing a processing stop and delay of said control system software to be a processing stop and delay of the entire system;

executing replacement of said control system software by said management processing device in a predetermined interval allowing replacement; and executing replacement of said information system software by said management processing device at an arbitrary time.

5. A software management method according to claim 4, further comprising the steps of:

if replacement of said control system software is needed, loading control system software to be replaced into said management processing device before said management processing device stops;

starting new control system software, instead of said control system software to be replaced, by reinitialization after said management processing device has stopped; and if said control system software to be replaced has stopped before a replacement success flag is turned on, automatically re-initializing and restoring said control system software to be replaced as said control system software to be replaced.

6. A software management method according to claim 3, further comprising the steps of:

designating at least one processing device out of said plurality of processing devices as a management processing device;

informing respective processing devices whereto predetermined software is distributed that the predetermined software has been updated, when the predetermined software has been updated in said management processing device;

distributing said updated predetermined software to respective processing devices or distributing said updated predetermined software to only predetermined processing devices based on predetermined information; and in each processing device which receives said updated predetermined software selectively replacing old predetermined software with said updated predetermined software based on predetermined information using said management processing device.

7. A software management method for a network system according to claim 3, further comprising the steps of:

designating at least one processing device out of said plurality of processing devices as a management processing device;

informing respective processing devices whereto predetermined software is distributed that the predetermined software has been updated, when the predetermined software has been updated in said management processing device; and distributing said updated predetermined software to only predetermined processing devices under a predetermined condition using said processing device.

8. A software management method for network system according to claim 7, wherein said predetermined condition is determined based on whether revision is present or not in the processing device.

9. A software management method for network system according to claim 7, wherein said predetermined condition is determined based on whether revision is present or not in the software.

10. A software management method for network system according to claim 7, wherein replacement can be performed, software to software, based on a revision value.

11. A software management method according to claim 3, further comprising the steps of:

designating at least one processing device out of said plurality of processing devices as a management processing device;

securing an area other than an area storing presently operating software in a processing device; and when loading software from said management processing device into said area of said processing device, determining whether said loading can be done.

12. A software management method according to claim 11, wherein said determining step comprises the step of:

determining whether specified loading software can be loaded into a specified loading destination processing device by referring to information for managing whether software can be loaded and information for managing whether loading can be done in said management processing device.

13. A software management method according to claim 11, wherein said software management method further comprises the steps of:

providing each software with a management number for managing a version of software, a software name needed for identifying the software and initiating operation thereof, and a management number needed for the software to operate;

determining whether software needed for operation of software which is the subject of loading can be used in said processing device;

referring to change history information of a single program forming the software after the determination; and loading only programs in which change has occurred as indicated by said change history information.

14. A software management method according to claim 3, said software management method further comprising the step of:

replacing, by said maintenance information system network, software on said processing devices when said software has been changed.

15. A software management method according to claim 14, wherein said replacing step comprises the steps of:

securing an areas other than an area for storing operating software, in each processing device prior to changeover of said processing device to new software; and storing the new software in said area prior to changeover.

16. A software management method according to claim 15, wherein said storing step comprises the step of:

storing before changeover, on programs in which change has occurred based on change history, information of each single program of software.

17. A software management method for network system according to claim 15, wherein said software management method further comprising the steps of:

at the time of changeover to new software, storing old software in an area different from an area for storing operating software of said processing device; and even after said changeover, changing back from the new software to said old software.

18. A software management method according to claim 3, further comprising the steps of:

designating at least one processing device out of said plurality of processing devices as a management processing device;

providing, in said management processing device, information for managing whether loading can be done and information for managing whether loading can be done in software; and at the time of loading, determining whether loading can be done by referring to said information.

19. A software management method according to claim 18, wherein said network system further includes:

means for setting a specific identification number with respect to each processing device and storing said identification number in said processing device; and means for storing said identification number together with stored program in a program storage medium, and at the time of loading the program from said program storage medium verification of the identification number is performed.

20. A software management method according to claim 18, wherein said network system further includes:

means for providing each program with a program version number, a program name needed for identifying the program to initiate operation thereof, and a version number need for the program to operate; and means for confirming that program needed for operation of program which is the subject of loading can be used by referring to said information at the time of loading.

* * * * *